United States Patent
Chang et al.

(10) Patent No.: US 9,601,983 B2
(45) Date of Patent: Mar. 21, 2017

(54) FLYBACK POWER CONVERTER WITH WEIGHTED FREQUENCY AND QUASI-RESONANCE

(71) Applicants: Kuang-Fu Chang, Kaohsiung (TW); Tzu-Chen Lin, Changhua (TW); Li-Di Luo, Taichung (TW)

(72) Inventors: Kuang-Fu Chang, Kaohsiung (TW); Tzu-Chen Lin, Changhua (TW); Li-Di Luo, Taichung (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 58 days.

(21) Appl. No.: 14/691,446

(22) Filed: Apr. 20, 2015

(65) Prior Publication Data

US 2015/0311778 A1    Oct. 29, 2015

Related U.S. Application Data

(60) Provisional application No. 61/983,962, filed on Apr. 24, 2014.

(51) Int. Cl.
*H02M 3/335* (2006.01)
*H02M 1/14* (2006.01)
*H02M 1/00* (2006.01)

(52) U.S. Cl.
CPC ....... *H02M 1/143* (2013.01); *H02M 3/33507* (2013.01); *H02M 2001/0058* (2013.01); *Y02B 70/1433* (2013.01); *Y02B 70/1491* (2013.01)

(58) Field of Classification Search
CPC .......................... H02M 3/335–3/3388
See application file for complete search history.

(56) References Cited

U.S. PATENT DOCUMENTS

| | | | |
|---|---|---|---|
| 8,238,123 B2* | 8/2012 | Zhang | H02M 3/338 363/21.12 |
| 2005/0261821 A1* | 11/2005 | Abe | F02D 35/027 701/111 |
| 2015/0029762 A1* | 1/2015 | Lu | H02M 3/33523 363/21.17 |
| 2015/0244246 A1* | 8/2015 | Krueger | H02M 1/00 363/21.17 |

* cited by examiner

*Primary Examiner* — Harry Behm
*Assistant Examiner* — Peter Novak
(74) *Attorney, Agent, or Firm* — Tung & Associates

(57) ABSTRACT

The present invention provides a flyback power converter and a control circuit and a control method thereof. The flyback power converter includes: a power stage circuit, a voltage sense circuit, a current sense circuit, and a control circuit. When the flyback power converter operates in a quasi-resonant mode, the control circuit determines a time point of turning OFF a power switch in the power stage circuit according to a current sense signal, a pulse width modulation (PWM) frequency of a PWM signal, and a predetermined threshold, wherein the control circuit adaptively adjusts an ON period of the power switch, or adaptively adjusts an operation bandwidth or an amplifier gain of an error amplifier circuit in a feedback control loop according to the PWM frequency to mitigate an output voltage ripple.

20 Claims, 8 Drawing Sheets

FLYBACK POWER CONVERTER WITH WEIGHTED FREQUENCY AND QUASI-RESONANCE

CROSS REFERENCE

The present invention claims priority to U.S. 61/983,962, filed on Apr. 24, 2014.

BACKGROUND OF THE INVENTION

Field of Invention

The present invention relates to a flyback power converter and a control circuit and a control method thereof; particularly, it relates to such a flyback power converter and a control circuit and a control method thereof, wherein when the flyback power converter operates in a quasi-resonant (QR) mode, an operation of a power switch therein is adaptively adjusted according to a pulse width modulation (PWM) frequency.

Description of Related Art

Quasi-resonant (QR) mode is an operation mode for a flyback power converter to keep operating in a boundary condition of a discontinuous current mode (DCM), to prevent the flyback power converter from entering into a continuous current mode (CCM). However, when the flyback power converter operates in the QR mode, the bandwidth is reduced which causes an output ripple problem.

In view of the above, the present invention proposes a flyback power converter and a control circuit and a control method thereof, wherein when the flyback power converter operates in the QR mode, an ON period of a power switch or an operation bandwidth of an error amplifier circuit therein is adaptively adjusted according to a PWM frequency, to compensate the output ripple.

SUMMARY OF THE INVENTION

From one perspective, the present invention provides a flyback power converter, comprising: a power stage circuit, for operating a power switch therein to convert an input voltage to an output voltage according to a pulse width modulation (PWM) signal; a voltage sense circuit, which is coupled to the power stage circuit, for generating a voltage sense signal according to the output voltage; a current sense circuit, which is coupled to the power stage circuit, for generating a current sense signal according to a switch current flowing through the power switch; and a control circuit, which is coupled to the power stage circuit, the voltage sense circuit, and the current sense circuit, for generating the PWM signal according to the voltage sense signal and the current sense signal; wherein when the flyback power converter operates in a quasi-resonant (QR) mode, the control circuit determines a time point of turning ON the power switch according to a zero voltage crossing event (ZVC) of the output voltage which is indicated by the voltage sense signal that the output voltage changes from a non-zero voltage to zero voltage, and determines a time point of turning OFF the power switch according to the current sense signal, a PWM frequency of the PWM signal, and a predetermined threshold; wherein the control circuit adaptively adjusts an ON period of the power switch or an operation bandwidth or an amplifier gain of an error amplifier circuit in the control circuit according to the PWM frequency, to compensate an output voltage ripple.

In one preferable embodiment, the control circuit adaptively adjusts the ON period, the operation bandwidth, or the amplifier gain according to the PWM frequency, to change a peak of the current sense signal, such that an input power of the flyback power converter maintains constant, and $$P = \frac{1}{2} fs \times Lm \times \left(\frac{Vcs}{Rcs}\right)^2$$

wherein P is the input power, fs is the PWM frequency, Lm is a primary side inductance of a transformer in the power stage circuit, Vcs is the peak of the current sense signal, and Rcs is a resistance of the current sense circuit.

In one preferable embodiment, the control circuit adaptively adjusts the ON period according to the PWM frequency by one or more of the methods listed below:

(1) adaptively adjusting the predetermined threshold to generate an adjusted threshold according to the PWM frequency, and when the current sense signal reaches the adjusted threshold, controlling the PWM signal to turn OFF the power switch; and (2) adaptively processing the current sense signal to generate a current indication signal according to the PWM frequency, and when the current indication signal reaches the predetermined threshold, controlling the PWM signal to turn OFF the power switch.

In one preferable embodiment, the control circuit adaptively adjusts the predetermined threshold to generate the adjusted threshold, and the control circuit includes: a QR control circuit, which is coupled to the voltage sense circuit, for generating a set signal when a ZVC of the output voltage occurs, and generating a QR mode indication signal when the flyback power converter operates in the QR mode; a frequency sense circuit, for generating a period length signal according to the PWM frequency; a gain control circuit, which is coupled to the QR control circuit and the frequency sense circuit, for generating the adjusted threshold according to the QR mode indication signal, the period length signal, and the predetermined threshold; a comparison circuit, which is coupled to the gain control circuit and the current sense circuit, for comparing the current sense signal with the adjusted threshold, to generate a reset signal; and a PWM signal generation circuit, which is coupled to the comparison circuit and the QR control circuit, for generating the PWM signal according to the set signal and the reset signal.

In one preferable embodiment, the gain control circuit includes: a frequency weighting circuit, which is coupled to the QR control circuit and the frequency sense circuit, for generating a frequency weighting signal related to the PWM frequency according to the QR mode indication signal, the PWM signal, and the period length signal; and a calculation circuit, which is coupled to the frequency weighting circuit, for generating the adjusted threshold according to the predetermined threshold and the frequency weighting signal.

In one preferable embodiment, the control circuit adaptively processes the current sense signal to generate the current indication signal according to the PWM frequency, and the control circuit includes: a QR control circuit, which is coupled to the voltage sense circuit, for generating a set signal when a ZVC of the output voltage occurs, and generating a QR mode indication signal when the flyback power converter operates in the QR mode; a frequency sense circuit, for generating a period length signal according to the PWM frequency; a gain control circuit, which is coupled to the QR control circuit, the frequency sense circuit, and the current sense circuit, for adaptively processing the current sense signal to generate a current indication signal according to the QR mode indication signal and the period length signal; a comparison circuit, which is coupled to the gain control circuit, for comparing the current indication signal with the predetermined threshold, to generate a reset signal; and a PWM signal generation circuit, which is coupled to the comparison circuit and the QR control circuit, for generating the PWM signal according to the set signal and the reset signal.

In one preferable embodiment, the gain control circuit includes: a frequency weighting circuit, which is coupled to the QR control circuit and the frequency sense circuit, for generating a frequency weighting signal related to the PWM frequency according to the QR mode indication signal, the PWM signal, and the period length signal; and a calculation circuit, which is coupled to the frequency weighting circuit, for generating the current indication signal according to the current sense signal and the frequency weighting signal.

In one preferable embodiment, the control circuit adaptively adjusts the operation bandwidth of the error amplifier circuit according to the PWM frequency, and the control circuit includes: a QR control circuit, which is coupled to the voltage sense circuit, for generating a QR mode indication signal when the flyback power converter operates in the QR mode; a frequency sense circuit, for generating a period length signal according to the PWM frequency; the error amplifier circuit, including: a bandwidth control circuit, which is coupled to the QR control circuit and the frequency sense circuit, for generating an adjustment signal according to the QR mode indication signal and the period length signal; an amplification circuit, which is coupled to the voltage sense circuit, for generating an amplification signal according to a reference voltage and the voltage sense signal; a resistance compensation circuit, which is coupled to the bandwidth control circuit and the amplification circuit; and a capacitance compensation circuit, which is coupled to the bandwidth control circuit and the amplification circuit; and a PWM signal generation circuit, which is coupled to the error amplifier circuit and the current sense circuit, for generating the PWM signal according to the amplification signal and the current sense signal; wherein the error amplifier circuit adaptively adjusts the operation bandwidth of the error amplifier circuit to compensate the output voltage ripple by adjusting a compensation resistance of the resistance compensation circuit or a compensation capacitance of the capacitance compensation circuit or both according to the adjustment signal.

In one preferable embodiment, the control circuit adaptively adjusts the amplifier gain of the error amplifier circuit according to the PWM frequency, and the control circuit includes: a QR control circuit, which is coupled to the voltage sense circuit, for generating a QR mode indication signal when the flyback power converter operates in the QR mode; a frequency sense circuit, for generating a period length signal according to the PWM frequency; the error amplifier circuit, including: an amplifier gain control circuit, which is coupled to the QR control circuit and the frequency sense circuit, for generating an amplifier gain adjustment signal according to the QR mode indication signal and the period length signal, wherein the amplifier gain adjustment signal is for adjusting an amplifier gain of the error amplifier circuit; an amplification circuit, which is coupled to the voltage sense circuit, for generating an amplification signal according to a reference voltage, the voltage sense signal, and the amplifier gain; a resistance compensation circuit, which is coupled to the amplification circuit; and a capacitance compensation circuit, which is coupled to the amplification circuit; and a PWM signal generation circuit, which is coupled to the error amplifier circuit and the current sense circuit, for generating the PWM signal according to the amplification signal and the current sense signal.

From another perspective, the present invention provides a control circuit of a flyback power converter, wherein the flyback power converter includes a power stage circuit, a voltage sense circuit, a current sense circuit, and the control circuit, wherein the power stage circuit operates a power switch therein to convert an input voltage to an output voltage according to a pulse width modulation (PWM) signal, and the voltage sense circuit is coupled to the power stage circuit, for generating a voltage sense signal according to the output voltage, and the current sense circuit is coupled to the power stage circuit, for generating a current sense signal according to a switch current flowing through the power switch, and the control circuit is coupled to the power stage circuit, the voltage sense circuit, and the current sense circuit, for generating the PWM signal according to the voltage sense signal and the current sense signal, wherein when the flyback power converter operates in a quasi-resonant (QR) mode, the control circuit determines a time point of turning ON the power switch according to a zero voltage crossing event (ZVC) of the output voltage which is indicated by the voltage sense signal that the output voltage changes from a non-zero voltage to zero voltage, and determines a time point of turning OFF the power switch according to the current sense signal, a PWM frequency of the PWM signal, and a predetermined threshold, wherein the control circuit adaptively adjusts an ON period of the power switch according to the PWM frequency to compensate an output voltage ripple, the control circuit comprising: a QR control circuit, which is coupled to the voltage sense circuit, for generating a set signal when a ZVC of the output voltage occurs, and generating a QR mode indication signal when the flyback power converter operates in the QR mode; a frequency sense circuit, for generating a period length signal according to the PWM frequency; a gain control circuit, which is coupled to the QR control circuit and the frequency sense circuit, for generating an adjusted threshold by adaptively adjusting the predetermined threshold according to the QR mode indication signal and the period length signal; a comparison circuit, which is coupled to the gain control circuit and the current sense circuit, for comparing the current sense signal with the adjusted threshold, to generate a reset signal; and a PWM signal generation circuit, which is coupled to the comparison circuit and the QR control circuit, for generating the PWM signal according to the set signal and the reset signal, such that when the voltage sense signal indicates that a ZVC of the output voltage occurs, the power switch is turned ON, and when the current sense signal reaches the adjusted threshold, the power switch is turned OFF.

In one preferable embodiment, the gain control circuit includes: a frequency weighting circuit, which is coupled to the QR control circuit and the frequency sense circuit, for generating a frequency weighting signal related to the PWM frequency according to the QR mode indication signal, the PWM signal, and the period length signal; and a calculation circuit, which is coupled to the frequency weighting circuit, for generating the adjusted threshold according to the predetermined threshold and the frequency weighting signal.

In one preferable embodiment, the control circuit adaptively adjusts the ON period according to the PWM frequency, to change a peak of the current sense signal, such that an input power of the flyback power converter maintains constant, and $$P = \frac{1}{2} fs \times Lm \times \left(\frac{Vcs}{Rcs}\right)^2$$

wherein P is the input power, fs is the PWM frequency, Lm is a primary side inductance of a transformer in the power stage circuit, Vcs is the peak of the current sense signal, and Rcs is a resistance of the current sense circuit.

From another perspective, the present invention provides a control circuit of a flyback power converter, wherein the flyback power converter includes a power stage circuit, a voltage sense circuit, a current sense circuit, and the control circuit, wherein the power stage circuit operates a power switch therein to convert an input voltage to an output voltage according to a pulse width modulation (PWM) signal, and the voltage sense circuit is coupled to the power stage circuit, for generating a voltage sense signal according to the output voltage, and the current sense circuit is coupled to the power stage circuit, for generating a current sense signal according to a switch current flowing through the power switch, and the control circuit is coupled to the power stage circuit, the voltage sense circuit, and the current sense circuit, for generating the PWM signal according to the voltage sense signal and the current sense signal, wherein when the flyback power converter operates in a quasi-resonant (QR) mode, the control circuit determines a time point of turning ON the power switch according to a zero voltage crossing event (ZVC) of the output voltage indicated by the voltage sense signal, and determines a time point of turning OFF the power switch according to the current sense signal, a PWM frequency of the PWM signal, and a predetermined threshold, wherein the control circuit adaptively adjusts an ON period of the power switch according to the PWM frequency to compensate an output voltage ripple, the control circuit comprising: a QR control circuit, which is coupled to the voltage sense circuit, for generating a set signal when a ZVC of the output voltage occurs, and generating a QR mode indication signal when the flyback power converter operates in the QR mode; a frequency sense circuit, for generating a period length signal according to the PWM frequency; a gain control circuit, which is coupled to the QR control circuit, the frequency sense circuit, and the current sense circuit, for adaptively processing the current sense signal to generate a current indication signal according to the QR mode indication signal and the period length signal; a comparison circuit, which is coupled to the gain control circuit, for comparing the current indication signal with the predetermined threshold, to generate a reset signal; and a PWM signal generation circuit, which is coupled to the comparison circuit and the QR control circuit, for generating the PWM signal according to the set signal and the reset signal, such that when the voltage sense signal indicates that a ZVC of the output voltage occurs, the power switch is turned ON, and when the current indication signal reaches the adjusted threshold, the power switch is turned OFF.

In one preferable embodiment, the gain control circuit includes: a frequency weighting circuit, which is coupled to the QR control circuit and the frequency sense circuit, for generating a frequency weighting signal related to the PWM frequency according to the QR mode indication signal, the PWM signal, and the period length signal; and a calculation circuit, which is coupled to the frequency weighting circuit, for generating the current indication signal according to the current sense signal and the frequency weighting signal.

In one preferable embodiment, the control circuit adaptively adjusts the ON period according to the PWM frequency to change a peak of the current sense signal, such that an input power of the flyback power converter maintains constant, and $$P = \frac{1}{2} fs \times Lm \times \left(\frac{Vcs}{Rcs}\right)^2$$

wherein P is the input power, fs is the PWM frequency, Lm is a primary side inductance of a transformer in the power stage circuit, Vcs is the peak of the current sense signal, and Rcs is a resistance of the current sense circuit.

From another perspective, the present invention provides a control circuit of a flyback power converter, wherein the flyback power converter includes a power stage circuit, a voltage sense circuit, a current sense circuit, and the control circuit, wherein the power stage circuit operates a power switch therein to convert an input voltage to an output voltage according to a pulse width modulation (PWM) signal, and the voltage sense circuit is coupled to the power stage circuit, for generating a voltage sense signal according to the output voltage, and the current sense circuit is coupled to the power stage circuit, for generating a current sense signal according to a switch current flowing through the power switch, and the control circuit is coupled to the power stage circuit, the voltage sense circuit, and the current sense circuit, for generating the PWM signal according to the voltage sense signal and the current sense signal, wherein when the flyback power converter operates in a quasi-resonant (QR) mode, the control circuit determines a time point of turning ON the power switch according to a zero voltage crossing event (ZVC) of the output voltage which is indicated by the voltage sense signal that the output voltage changes from a non-zero voltage to zero voltage, and determines a time point of turning OFF the power switch according to the current sense signal, a PWM frequency of the PWM signal, and a predetermined threshold, the control circuit comprising: a QR control circuit, which is coupled to the voltage sense circuit, for generating a QR mode indication signal when the flyback power converter operates in the QR mode; a frequency sense circuit, for generating a period length signal according to the PWM frequency; an error amplifier circuit, including: a bandwidth control circuit, which is coupled to the QR control circuit and the frequency sense circuit, for generating an adjustment signal according to the QR mode indication signal and the period length signal; an amplification circuit, which is coupled to the voltage sense circuit, for generating an amplification signal according to a reference voltage and the voltage sense signal; a resistance compensation circuit, which is coupled to the bandwidth control circuit and the amplification circuit; and a capacitance compensation circuit, which is coupled to the bandwidth control circuit and the amplification circuit; and a PWM signal generation circuit, which is coupled to the error amplifier circuit and the current sense circuit, for generating the PWM signal according to the amplification signal and the current sense signal; wherein the error amplifier circuit adaptively adjusts the operation bandwidth of the error amplifier circuit to compensate the output voltage ripple by adjusting a compensation resistance of the resistance compensation circuit or a compensation capacitance of the capacitance compensation circuit or both according to the adjustment signal.

In one preferable embodiment, the control circuit adaptively adjusts the operation bandwidth according to the PWM frequency to change a peak of the current sense signal, such that an input power of the flyback power converter maintains constant, and $$P = \frac{1}{2} fs \times Lm \times \left(\frac{Vcs}{Rcs}\right)^2$$

wherein P is the input power, fs is the PWM frequency, Lm is a primary side inductance of a transformer in the power stage circuit, Vcs is the peak of the current sense signal, and Rcs is a resistance of the current sense circuit.

From another perspective, the present invention provides a control circuit of a flyback power converter, wherein the flyback power converter includes a power stage circuit, a voltage sense circuit, a current sense circuit, and the control circuit, wherein the power stage circuit operates a power switch therein to convert an input voltage to an output voltage according to a pulse width modulation (PWM) signal, and the voltage sense circuit is coupled to the power stage circuit, for generating a voltage sense signal according to the output voltage, and the current sense circuit is coupled to the power stage circuit, for generating a current sense signal according to a switch current flowing through the power switch, and the control circuit is coupled to the power stage circuit, the voltage sense circuit, and the current sense circuit, for generating the PWM signal according to the voltage sense signal and the current sense signal, wherein when the flyback power converter operates in a quasi-resonant (QR) mode, the control circuit determines a time point of turning ON the power switch according to a zero voltage crossing event (ZVC) of the output voltage which is indicated by the voltage sense signal that the output voltage changes from a non-zero voltage to zero voltage, and determines a time point of turning OFF the power switch according to the current sense signal, a PWM frequency of the PWM signal, and a predetermined threshold, wherein the control circuit adaptively an amplifier gain of an error amplifier therein according to the PWM frequency, the control circuit comprising: a QR control circuit, which is coupled to the voltage sense circuit, for generating a QR mode indication signal when the flyback power converter operates in the QR mode; a frequency sense circuit, for generating a period length signal according to the PWM frequency; the error amplifier circuit, including: an amplifier gain control circuit, which is coupled to the QR control circuit and the frequency sense circuit, for generating an amplifier gain adjustment signal according to the QR mode indication signal and the period length signal; an amplification circuit, which is coupled to the voltage sense circuit, for adjusting the amplifier gain according to the amplifier gain adjustment signal, and generating an amplification signal according to a reference voltage, the voltage sense signal, and the amplifier gain; a resistance compensation circuit, which is coupled to the amplification circuit; and a capacitance compensation circuit, which is coupled to the amplification circuit; and a PWM signal generation circuit, which is coupled to the error amplifier circuit and the current sense circuit, for generating the PWM signal according to the amplification signal and the current sense signal.

In one preferable embodiment, the control circuit adaptively adjusts the amplifier gain according to the PWM frequency to change a peak of the current sense signal, such that an input power of the flyback power converter maintains constant, and $$P = \frac{1}{2} fs \times Lm \times \left(\frac{Vcs}{Rcs}\right)^2$$

wherein P is the input power, fs is the PWM frequency, Lm is a primary side inductance of a transformer in the power stage circuit, Vcs is the peak of the current sense signal, and Rcs is a resistance of the current sense circuit.

From another perspective, the present invention provides a control method of a flyback power converter, comprising: operating a power switch of a power stage circuit to convert an input voltage to an output voltage according to a pulse width modulation (PWM) signal; generating a voltage sense signal according to the output voltage; generating a current sense signal according to a switch current flowing through the power switch; generating the PWM signal according to the voltage sense signal and the current sense signal, whereby a feedback control loop is formed; when the flyback power converter operates in a quasi-resonant (QR) mode, determining a time point of turning ON the power switch according to a zero voltage crossing event (ZVC) of the output voltage which is indicated by the voltage sense signal that the output voltage changes from a non-zero voltage to zero voltage, and determining a time point of turning OFF the power switch according to the current sense signal, a PWM frequency of the PWM signal, and a predetermined threshold; and adaptively adjusting an ON period of the power switch or an operation bandwidth or an amplifier gain of an error amplifier circuit in the feedback control loop according to the PWM frequency, to compensate an output voltage ripple.

In one preferable embodiment, the step of adaptively adjusting the ON period of the power switch or the operation bandwidth or the amplifier gain of the error amplifier circuit in the feedback control loop according to the PWM frequency to compensate the output voltage ripple, changes a peak of the current sense signal, such that an input power of the flyback power converter maintains constant, and $$P = \frac{1}{2} fs \times Lm \times \left(\frac{Vcs}{Rcs}\right)^2$$

wherein P is the input power, fs is the PWM frequency, Lm is a primary side inductance of a transformer in the power stage circuit, Vcs is the peak of the current sense signal, and Rcs is a resistance of the current sense circuit.

In one preferable embodiment, the step of adaptively adjusting the ON period of the power switch according to the PWM frequency, includes one or more of the methods listed below:

(1) adaptively adjusting the predetermined threshold to generate an adjusted threshold according to the PWM frequency, and when the current sense signal reaches the adjusted threshold, controlling the PWM signal to turn OFF the power switch; and (2) adaptively processing the current sense signal to generate a current indication signal according to the PWM frequency, and when the current indication signal reaches the predetermined threshold, controlling the PWM signal to turn OFF the power switch.

In one preferable embodiment, the step of adaptively adjusting the ON period of the power switch according to the PWM frequency to compensate the output voltage ripple, includes: generating a set signal when a ZVC of the output voltage occurs, and generating a QR mode indication signal when the flyback power converter operates in the QR mode; generating a period length signal according to the PWM frequency; generating the adjusted threshold according to the QR mode indication signal, the period length signal, and the predetermined threshold; comparing the current sense signal with the adjusted threshold to generate a reset signal; and generating the PWM signal according to the set signal and the reset signal.

In one preferable embodiment, the step of generating the adjusted threshold according to the QR mode indication signal, the period length signal, and the predetermined threshold, includes: generating a frequency weighting signal related to the PWM frequency according to the QR mode indication signal, the PWM signal, and the period length signal; and generating the adjusted threshold according to the predetermined threshold and the frequency weighting signal.

In one preferable embodiment, the step of adaptively adjusting the ON period of the power switch according to the PWM frequency to compensate the output voltage ripple, includes: generating a set signal when a ZVC of the output voltage occurs, and generating a QR mode indication signal when the flyback power converter operates in the QR mode; generating a period length signal according to the PWM frequency; adaptively processing the current sense signal to generate a current indication signal according to the QR mode indication signal and the period length signal; comparing the current indication signal with the predetermined threshold, to generate a reset signal; and generating the PWM signal according to the set signal and the reset signal.

In one preferable embodiment, the step of adaptively processing the current sense signal to generate a current indication signal according to the PWM frequency includes: generating a frequency weighting signal related to the PWM frequency according to the QR mode indication signal, the PWM signal, and the period length signal; and generating the current indication signal according to the current sense signal and the frequency weighting signal.

In one preferable embodiment, the step of adaptively adjusting the operation bandwidth of an error amplifier circuit in the feedback loop according to the PWM frequency to compensate the output voltage ripple, includes: generating a QR mode indication signal when the flyback power converter operates in the QR mode; generating a period length signal according to the PWM frequency; generating an adjustment signal according to the QR mode indication signal and the period length signal; generating an amplification signal according to a reference voltage and the voltage sense signal; and generating the PWM signal according to the amplification signal and the current sense signal; wherein the error amplifier circuit adaptively adjusts the operation bandwidth of the error amplifier circuit to compensate the output voltage ripple by adjusting a compensation resistance or a compensation capacitance or both according to the adjustment signal.

In one preferable embodiment, the step of adaptively adjusting the amplifier gain of the error amplifier circuit in the feedback control loop according to the PWM frequency to compensate the output voltage ripple, includes: generating a QR mode indication signal when the flyback power converter operates in the QR mode; generating a period length signal according to the PWM frequency; generating an amplifier gain adjustment signal according to the QR mode indication signal and the period length signal; adjusting an amplifier gain of the error amplifier circuit according to the amplifier gain adjustment signal; generating an amplification signal according to a reference voltage, the voltage sense signal, and the amplifier gain; and generating the PWM signal according to the amplification signal and the current sense signal.

The objectives, technical details, features, and effects of the present invention will be better understood with regard to the detailed description of the embodiments below.

DESCRIPTION OF THE PREFERRED EMBODIMENTS

Figure 1A:
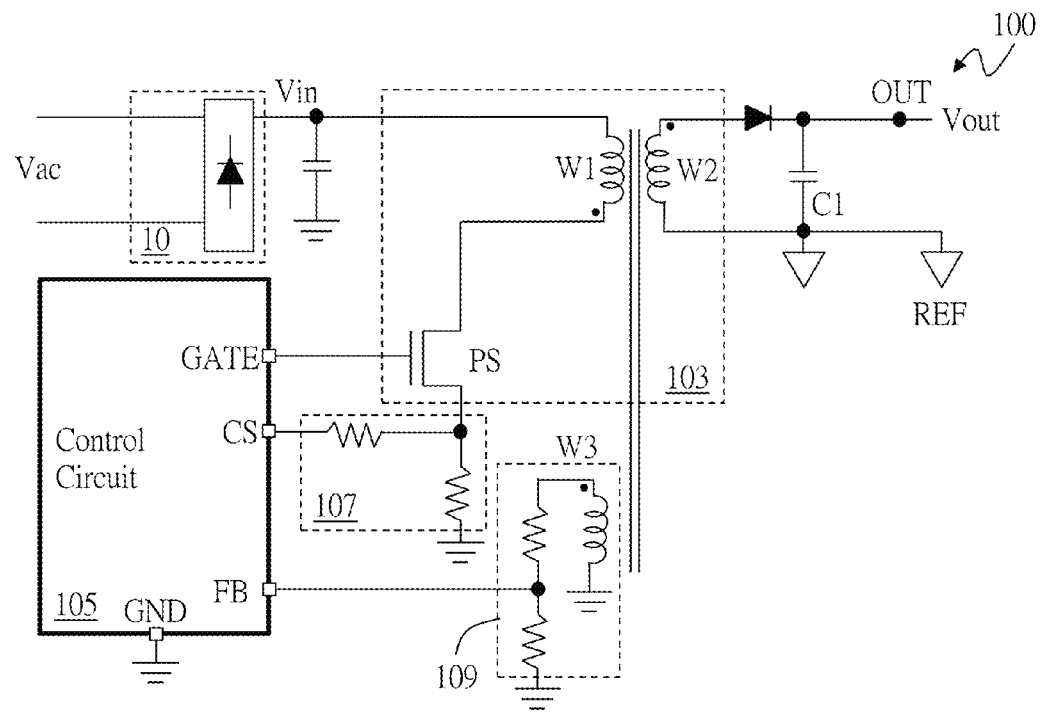
FIGS. 1A-1D show a first embodiment of the present invention.

Please refer to FIGS. 1A-1D for a first embodiment according to the present invention. As shown in FIG. 1A, a rectifier circuit 10 rectifies an AC voltage Vac to generate an input voltage Vin. The rectifier circuit 10 is for example a bridge rectifier circuit. The flyback power converter 100 includes a power stage circuit 103, a control circuit 105, a current sense circuit 107, and a voltage sense circuit 109. The power stage circuit 103 operates a power switch PS therein according to an operation signal GATE, to convert the input voltage Vin to an output voltage Vout, wherein the operation signal GATE is generated according to a pulse width modulation (PWM) signal. The voltage sense circuit 109 is coupled to the power stage circuit 103, for generating a voltage sense signal FB according to the output voltage Vout. The current sense circuit 107 is coupled to the power stage circuit 103, for generating a current sense signal CS according to a switch current flowing through the power switch PS. The control circuit 105 is coupled to the power stage circuit 103, the voltage sense circuit 109, and the current sense circuit 107, for generating the PWM signal according to the current sense signal CS and the voltage sense signal FB, and the control circuit 105 generates the operation signal GATE according to the PWM signal, to operate the power switch PS, so as to convert the input voltage Vin to the output voltage Vout. The power stage circuit 103 includes a transformer circuit and the power switch PS. The transformer circuit includes a primary winding W1 and a secondary winding W2. The secondary winding W2 is electrically connected to a reference level REF, and the primary winding W1 and a third winding W3 are coupled to a ground level GND. The voltage sense circuit 109 senses the output voltage Vout by the third winding W3 to generate the feedback signal FB, wherein the voltage across the third winding W3 is proportional to the voltage across the secondary winding W2, i.e., the output voltage Vout. For better logic in description, the third winding W3 is described as a part of the voltage sense circuit 109; in circuit implementation, the third winding W3 may be included as a part of the transformer circuit.

In this embodiment, when the flyback power converter 100 operates in a QR mode, the control circuit 105 determines a time point to turn ON the power switch PS when the voltage sense signal FB indicates that a zero voltage crossing event (ZVC) of the output voltage Vout occurs; and the control circuit 105 determines a time point to turn OFF the power switch PS according to the current sense signal CS, a PWM frequency of the PWM signal, and a predetermined threshold CS_TH. The ZVC of the output voltage Vout indicates that the output voltage Vout changes from a non-zero level to a zero level. The ZVC, the PWM signal and the frequency of the PWM signal (the PWM frequency), the CCM, the DCM, and the QR mode are well known by those skilled in this art and therefore are not redundantly explained here. One of the differences between this embodiment and the prior art is that, in this embodiment, the control circuit 105 adaptively adjusts an ON period of the power switch PS, an operation bandwidth, or an amplifier gain of an error amplifier circuit therein (not shown, which will be described later) according to the PWM frequency, to compensate an output voltage ripple.

In this embodiment, when the flyback power converter 100 operates in the QR mode, the control circuit 105 adaptively adjusts the ON period of the power switch PS, the operation bandwidth, or the amplifier gain of the error amplifier in the control circuit 105 according to the PWM frequency, to change a peak of the current sense signal CS (peak of the current sense signal), such that an input power of the flyback power converter 100 maintains constant, and $$P = \frac{1}{2} fs \times Lm \times \left(\frac{Vcs}{Rcs}\right)^2$$

wherein P is the input power, fs is the PWM frequency, Lm is a primary side inductance, Vcs is the peak of the current sense signal, and Rcs is a resistance of the current sense circuit 107. For example, when the PWM frequency fs decreases, the control circuit 105 adaptively adjusts the ON period of the power switch PS, the operation bandwidth, or the amplifier gain, to change the peak of the current sense signal Vcs of the current sense signal CS, such that a product of the square of the peak of the current sense signal Vcs ($Vcs^2$) and the PWM frequency fs maintains constant, to compensate the output voltage ripple.

The control circuit 105 may adaptively adjust the ON period according to the PWM frequency for example by at one or more of the methods listed below:
(1) adaptively adjusting the predetermined threshold CS_TH to generate an adjusted threshold CS_TH' according to the PWM frequency, and when the current sense signal CS reaches the adjusted threshold CS_TH', controlling the PWM signal to turn OFF the power switch PS; and
(2) adaptively processing the current sense signal CS to generate a current indication signal CS' according to the PWM frequency, and when the current indication signal CS' reaches the predetermined threshold CS_TH, controlling the PWM signal to turn OFF the power switch PS. The aforementioned two methods will be described in detail later.

Figure 1B:
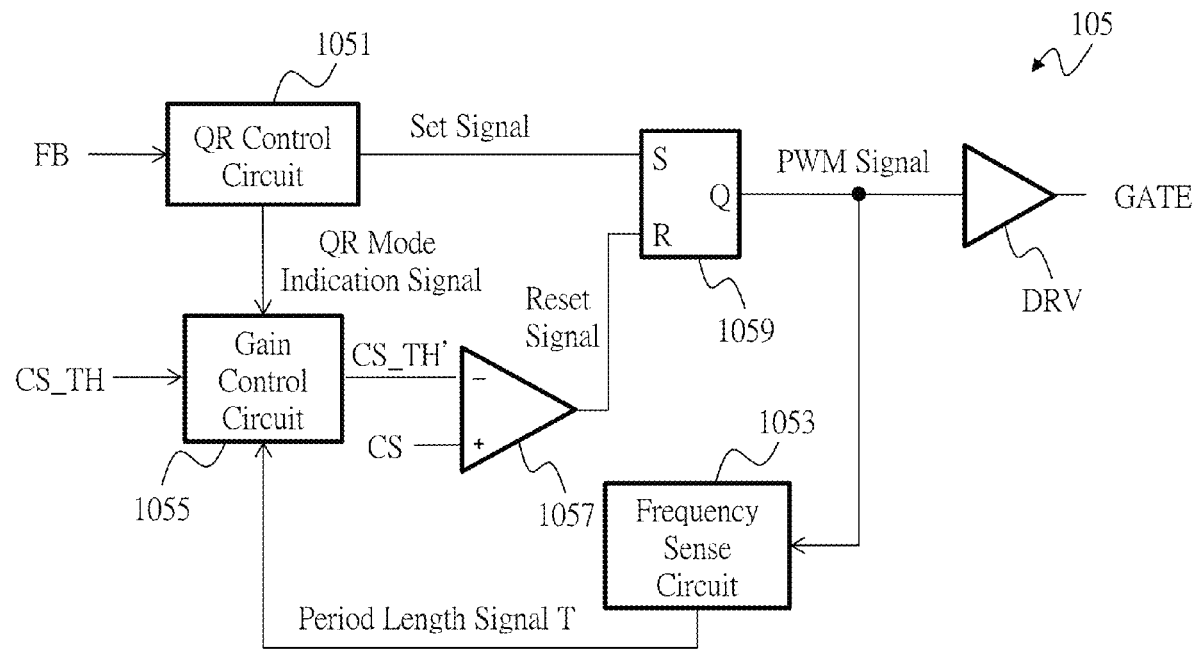

As shown in FIG. 1B, in this embodiment, the control circuit 105 includes, for example but not limited to: a QR control circuit 1051, a frequency sense circuit 1053, a gain control circuit 1055, a comparison circuit 1057, and a PWM signal generation circuit 1059. The QR control circuit 1051 is coupled to the voltage sense circuit 109, for generating a set signal when a ZVC of the output voltage Vout occurs, and generating a QR mode indication signal when the flyback power converter 100 operates in the QR mode. The frequency sense circuit 1053 generates a period length signal T according to the PWM frequency. The period length signal T is for example proportional to a reciprocal of the PWM frequency. The gain control circuit 1055 is coupled to the QR control circuit 1051 and the frequency sense circuit 1053, for generating the adjusted threshold CS_TH' according to the QR mode indication signal, the period length signal T, and the predetermined threshold CS_TH. The comparison circuit 1057 is coupled to the gain control circuit 1055 and the current sense circuit 107, for comparing the current sense signal CS with the adjusted threshold CS_TH', to generate a reset signal. The PWM signal generation circuit 1059 is coupled to the comparison circuit 1057 and the QR control circuit 1051, for generating the PWM signal according to the set signal and the reset signal. The PWM signal generation circuit 1059 is for example but not limited to an SR flip-flop, which is well known by those skilled in this art and therefore is not redundantly explained here. As shown in the figure, the control circuit 105 for example further includes a driver circuit DRV, for converting the PWM signal to the operation signal GATE. The control circuit 105 for example includes an integrated circuit (IC) chip, and the driver circuit DRV may be located inside or outside the IC chip.

Figure 1C:
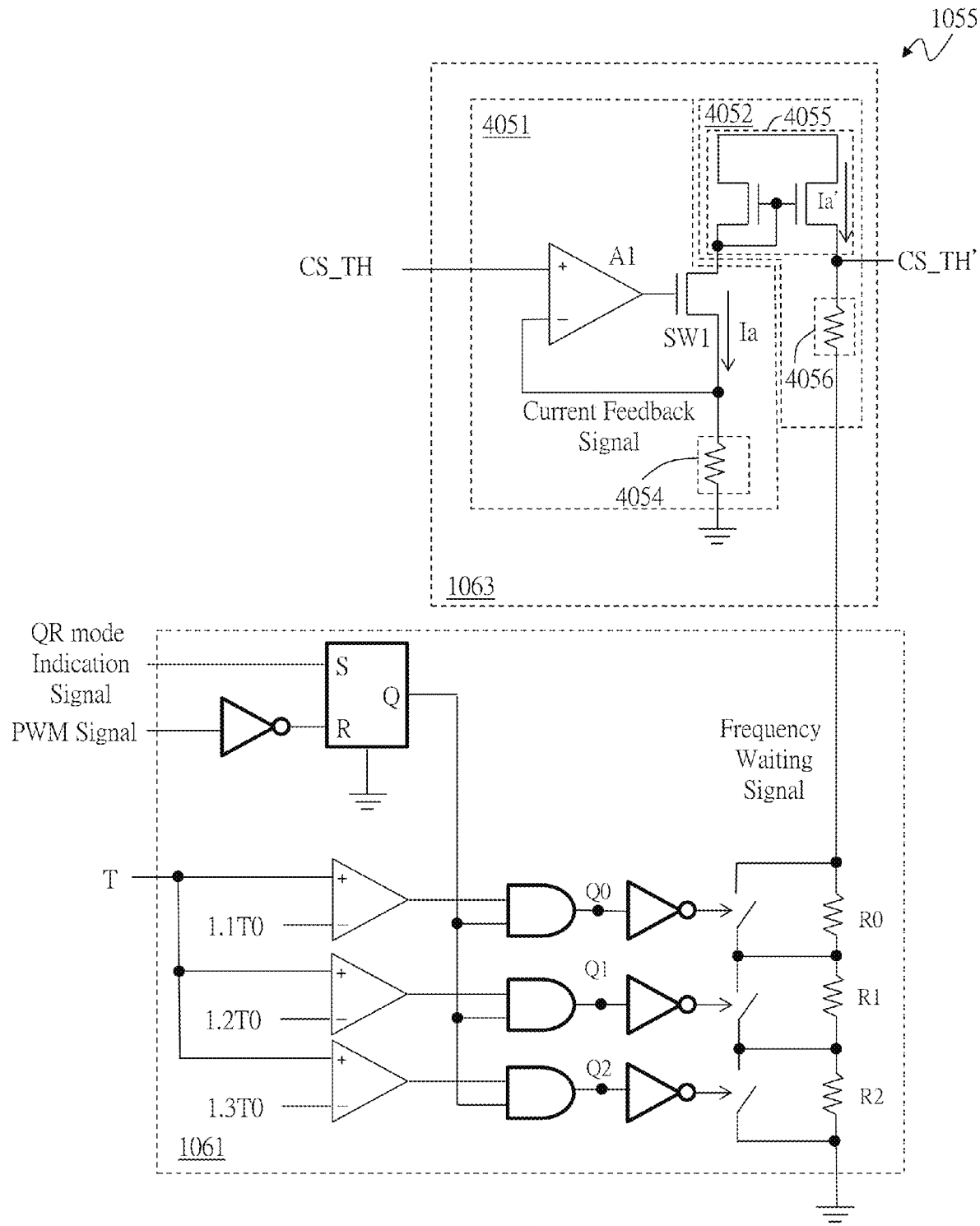

As shown in FIG. 1C, in this embodiment, the gain control circuit 1055 includes, for example but not limited to, a frequency weighting circuit 1061 and a calculation circuit 1063. The frequency weighting circuit 1061 is coupled to the QR control circuit 1051 and the frequency sense circuit 1053, for generating a frequency weighting signal according to the QR mode indication signal, the PWM signal, and the period length signal T. The calculation circuit 1063 is coupled to the frequency weighting circuit 1061, for generating the adjusted threshold CS_TH' according to the predetermined threshold CS_TH and the frequency weighting signal. As shown in the figure, the frequency weighting circuit 1061 for example includes plural resistors R0, R1, and R2 connected in series, and the total resistance of the resistors connected to the calculation circuit 1063 which is determined by plural switch control signals Q0, Q1, and Q2 controlling corresponding switches respectively, indicates the frequency weighting signal. The switch control signals Q0, Q1, and Q2 are generated as thus. An SR flip-flop receives the QR mode indication signal and a reverse signal of the PWM signal by its set and reset inputs respectively, to generate an output. The period length signal T is compared with different predetermined period length signals 1.1T0, 1.2T0, and 1.3T0 respectively to generate corresponding comparison results. Plural logic gates perform corresponding operations on the output of the SR flip-flop with the comparison results, to generate the switch control signals Q0, Q1, and Q2. Thus, when the flyback power converter 100 operates in the QR mode, the gain control circuit 1055 may generate the frequency weighting signal according to the PWM frequency, such that the calculation circuit 1063 can adaptively adjust the predetermined threshold CS_TH according to the frequency weighting signal, to generate the adjusted threshold CS_TH'. In this way, the control circuit 105 can adaptively adjust the ON period of the power switch PS according to the PWM frequency, to maintain the input power constant, and compensate the output voltage ripple. The logic gates are shown as AND gates and NOT gates in the figure, but it is well known to those skilled in this art that the logic gates can be arranged otherwise, depending on the definitions or functions of the high and low levels.

Still referring to FIG. 1C, the calculation circuit 1063 includes a voltage-to-current conversion circuit 4051 and a current-to-voltage conversion circuit 4052. The voltage-to-current conversion circuit 4051 includes: a differential amplifier circuit A1, a transistor SW1, and a resistor circuit

4054. The differential amplifier circuit A1 generates a differential amplification signal according to the predetermined threshold CS_TH and a current feedback signal. The transistor SW1 is coupled to the differential amplifier circuit A1, and it operates according to the differential amplification signal to generate a current Ia. The resistor circuit 4054 is coupled to the transistor SW1, for generating the current feedback signal according to the current Ia. As shown in the figure, the differential amplifier circuit A1 receives the predetermined threshold CS_TH, and compares it with the current feedback signal, to generate the differential amplification signal to operate the transistor SW1, wherein the current Ia is equal to the predetermined threshold CS_TH divided by a resistance of the resistor circuit 4054.

Still referring to FIG. 1C, in this embodiment, the current-to-voltage conversion circuit 4052 includes: a current mirror circuit 4055 and a resistor circuit 4056. The current mirror circuit 4055 is coupled to the transistor SW1, for duplicating the current Ia to generate a duplicate current Ia'. The resistor circuit 4056 is for example but not limited to a resistor as shown in the figure, which is coupled to the current mirror circuit 4055, for converting the duplicate current Ia' to the adjusted threshold CS_TH'. Note that the adjusted threshold CS_TH' is determined by a total resistance of the resistor circuit 4056 and the frequency weighting signal, the latter being the series resistance of some or all of the resistors R0, R1, and R2. When total resistance, determined by the frequency weighting signal, is relatively higher which indicates a lower the PWM frequency, the adjusted threshold CS_TH' is higher, such that the time for the current sense signal CS to reach the adjusted threshold CS_TH' is increased. Thus, when the PWM frequency decreases, the ON period of the power switch PS is adaptively increased, and the output voltage ripple is compensated.

Figure 1D:
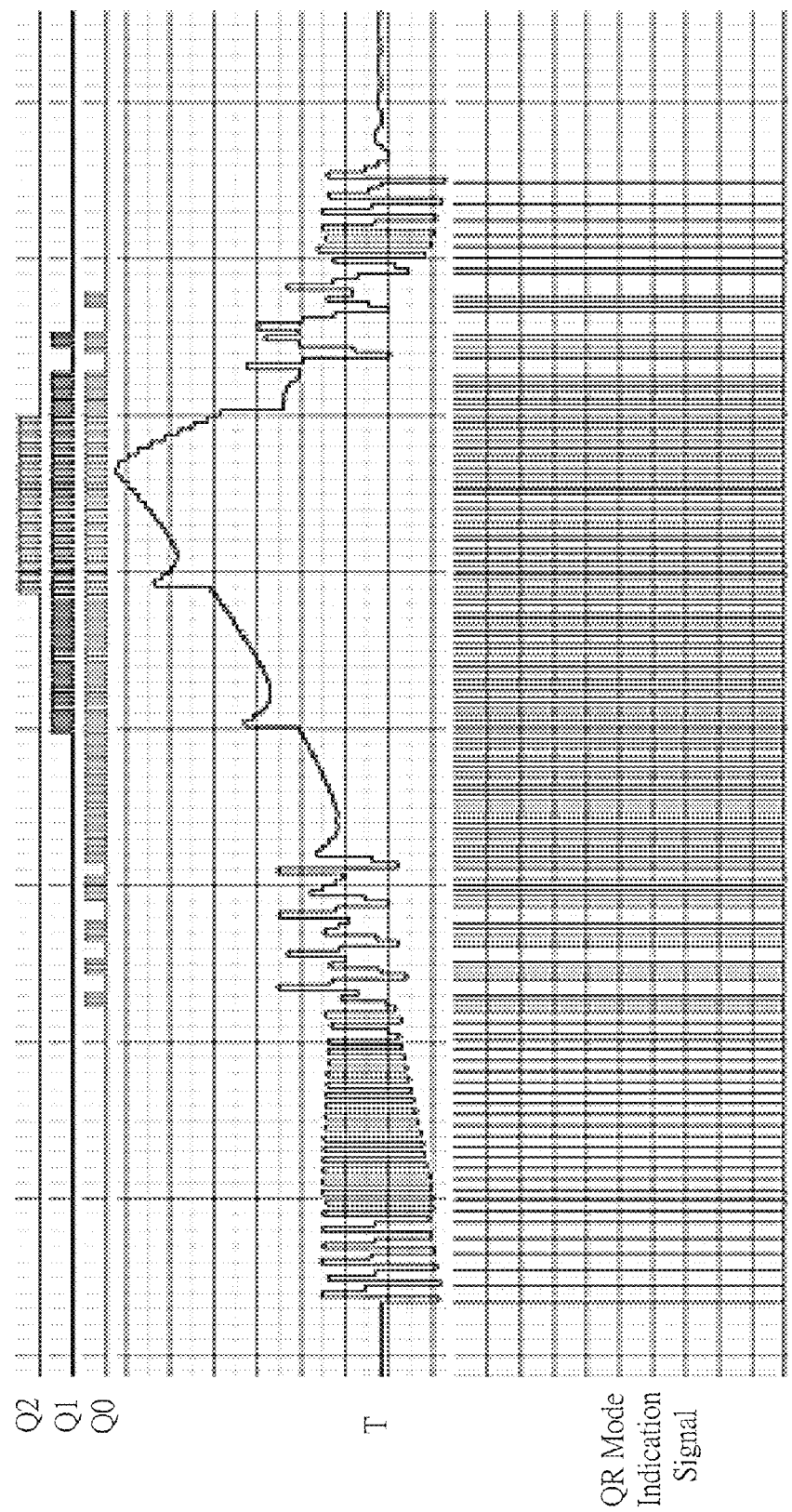

FIG. 1D shows signal waveforms of the switch control signals Q0, Q1, and Q2, the period length signal T, and the QR mode indication signal. As shown in the figure, in the QR mode, when the period length signal T is higher, indicating a lower PWM frequency, the frequency weighting signal is determined by the switch control signals Q0, Q1, and Q2, to adaptively increase the predetermined threshold CS_TH to generate the higher adjusted threshold CS_TH', such that the control circuit 105 maintains the input power (and the output power) constant, and compensates the output voltage ripple by adaptively adjusting the ON period of the power switch PS.

Figure 2A:
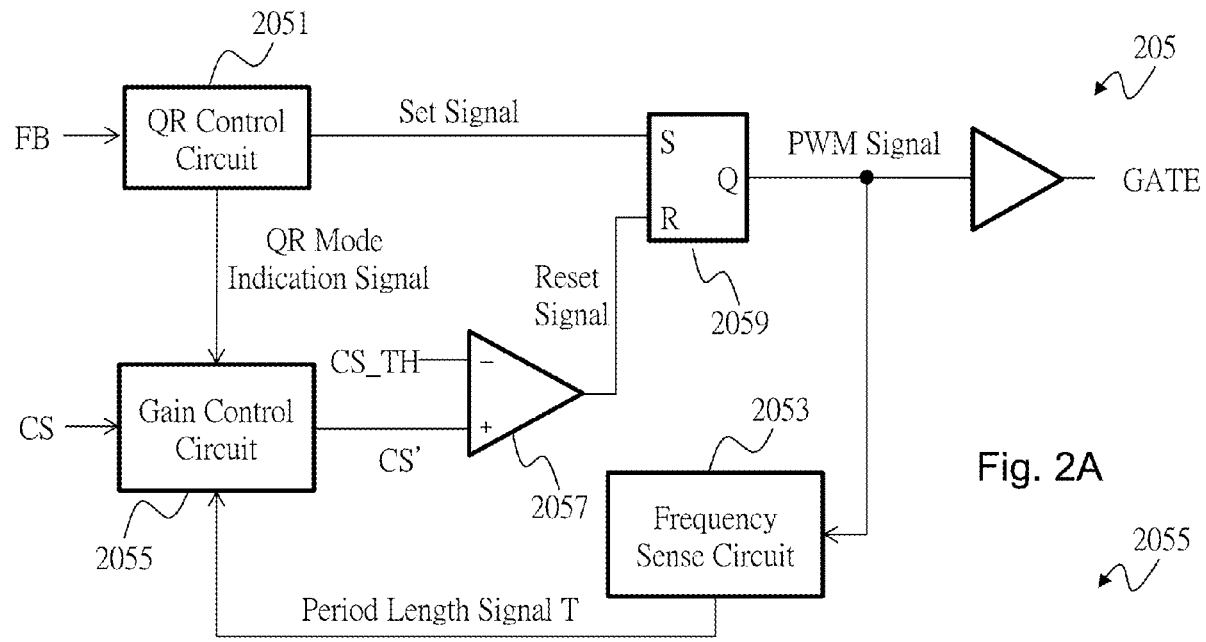
FIGS. 2A-2B show a second embodiment of the present invention.
Figure 2B:
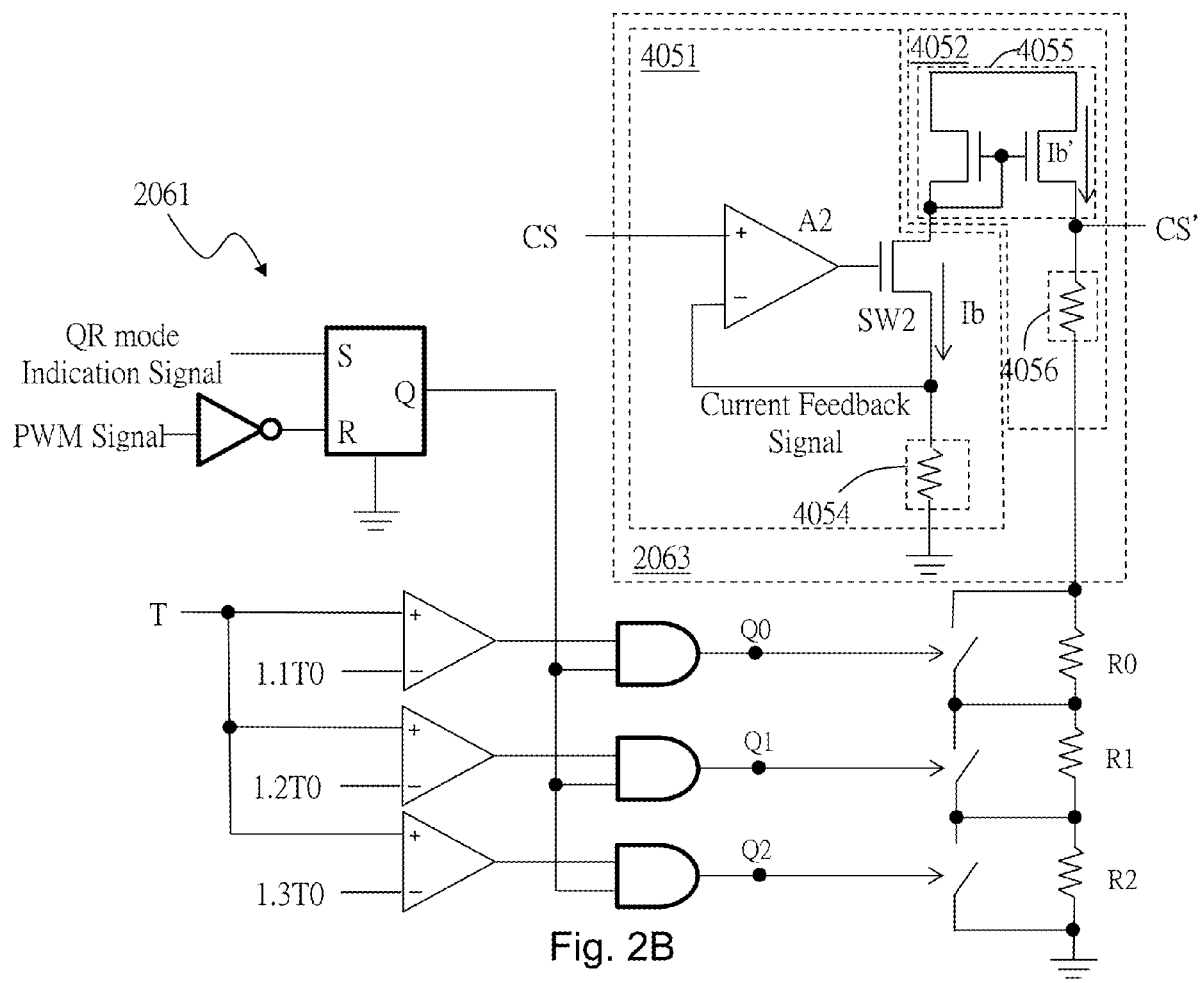

Please refer to FIGS. 2A-2B, which shows a second embodiment according to the present invention. As shown in FIG. 2A, in this embodiment, a control circuit 205 includes, for example but not limited to: a QR control circuit 2051, a frequency sense circuit 2053, a gain control circuit 2055, a comparison circuit 2057, and a PWM signal generation circuit 2059. The QR control circuit 2051 is coupled to the voltage sense circuit 109, for generating a set signal when a ZVC of the output voltage Vout occurs, and generating a QR mode indication signal when the flyback power converter 100 operates in the QR mode. The frequency sense circuit 2053 generates a period length signal T according to the PWM frequency. The period length signal T is for example proportional to a reciprocal of the PWM frequency. The gain control circuit 2055 is coupled to the current sense circuit 107, the QR control circuit 2051 and the frequency sense circuit 2053, for generating a current indicating signal CS' according to the QR mode indication signal, the period length signal T, and the current sense signal CS. The comparison circuit 2057 is coupled to the gain control circuit 2055, for comparing the current indicating signal CS' with the predetermined threshold CS_TH, to generate a reset signal. The PWM signal generation circuit 2059 is coupled to the comparison circuit 2057 and the QR control circuit 2051, for generating the PWM signal according to the set signal and the reset signal. The PWM signal generation circuit 2059 is for example but not limited to an SR flip-flop. As shown in the figure, the control circuit 205 may further include a driver circuit DRV, for converting the PWM signal to the operation signal GATE. The control circuit 205 for example includes an integrated circuit (IC) chip, and the driver circuit DRV may be located inside or outside the IC chip.

As shown in FIG. 2B, in this embodiment, the gain control circuit 2055 includes, for example but not limited to, a frequency weighting circuit 2061 and a calculation circuit 2063. The frequency weighting circuit 2061 is coupled to the QR control circuit 2051 and the frequency sense circuit 2053, for generating a frequency weighting signal according to the QR mode indication signal, the PWM signal, and the period length signal T. The calculation circuit 2063 is coupled to the frequency weighting circuit 2061, for generating the current indicating signal CS' according to the current sense signal CS and the frequency weighting signal. As shown in the figure, the frequency weighting circuit 2061 for example includes plural resistors R0, R1, and R2 connected in series, and the total resistance of the resistors connected to the calculation circuit 2063 which is determined by plural switch control signals Q0, Q1, and Q2 controlling corresponding switches respectively, indicates the frequency weighting signal. The switch control signals Q0, Q1, and Q2 are generated as thus. An SR flip-flop receives the QR mode indication signal and a reverse signal of the PWM signal by its set and reset inputs respectively, to generate an output. The period length signal T is compared with different predetermined period length signals 1.1T0, 1.2T0, and 1.3T0 respectively to generate corresponding comparison results. Plural logic gates perform corresponding operations on the output of the SR flip-flop with the comparison results, to generate the switch control signals Q0, Q1, and Q2. Thus, the gain control circuit 2055 may generate the frequency weighting signal according to the PWM frequency, such that the calculation circuit 2063 can adaptively adjust the current sense signal CS according to the frequency weighting signal, to generate the current indicating signal CS'. In this way, the control circuit 205 can adaptively adjust the ON period of the power switch PS according to the PWM frequency, to maintain the input power constant, and compensate the output voltage ripple. The logic gates are shown as AND gates in the figure, but it is well known to those skilled in this art that the logic gates can be arranged otherwise, depending on the definitions or functions of the high and low levels.

Still referring to FIG. 2B, the calculation circuit 2063 includes a voltage-to-current conversion circuit 4051 and a current-to-voltage conversion circuit 4052. The voltage-to-current conversion circuit 4051 includes: a differential amplifier circuit A2, a transistor SW2, and a resistor circuit 4054. The differential amplifier circuit A2 generates a differential amplification signal according to the current sense signal CS and the current feedback signal. The transistor SW2 is coupled to the differential amplifier circuit A2, and it operates according to the differential amplification signal to generate a current Ib. The resistor circuit 4054 is coupled to the transistor SW2, for generating the current feedback signal according to the current Ib. As shown in the figure, the differential amplifier circuit A2 receives the current sense signal CS, and compares it with the current feedback signal, to generate the differential amplification signal for operating the transistor SW2, wherein the current Ib is equal to the current sense signal CS divided by a resistance of the resistor circuit 4054.

Still referring to FIG. 2B, in this embodiment, the current-to-voltage conversion circuit 4052 includes: a current mirror circuit 4055 and a resistor circuit 4056. The current mirror circuit 4055 is coupled to the transistor SW2, for duplicating the current Ib to generate a duplicate current Ib'. The resistor circuit 4056 is for example but not limited to a resistor as shown in the figure, which is coupled to the current mirror circuit 4055, for converting the duplicate current Ib' to the current indication signal CS'. Note that the current indication signal CS' is determined by a total resistance of the resistor circuit 4056 and the frequency weighting signal, the latter being the series resistance of some or all of the resistors R0, R1, and R2. When total resistance, determined by the frequency weighting signal, is relatively lower which indicates a lower the PWM frequency, the current indication signal CS' is lower, such that the time for the current indication signal CS' to reach the threshold CS_TH is increased. Thus, when the PWM frequency decreases, the ON period of the power switch PS is adaptively increased, and the output voltage ripple is compensated.

Figure 3A:
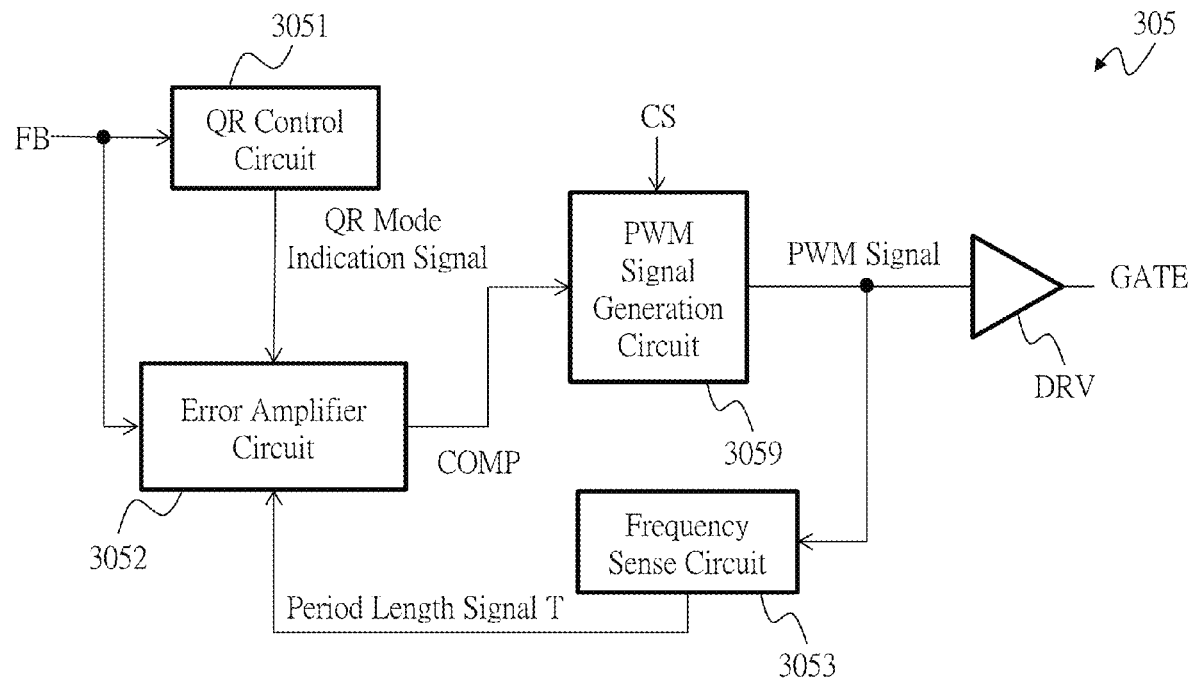
FIGS. 3A-3B show a third embodiment of the present invention.
Figure 3B:
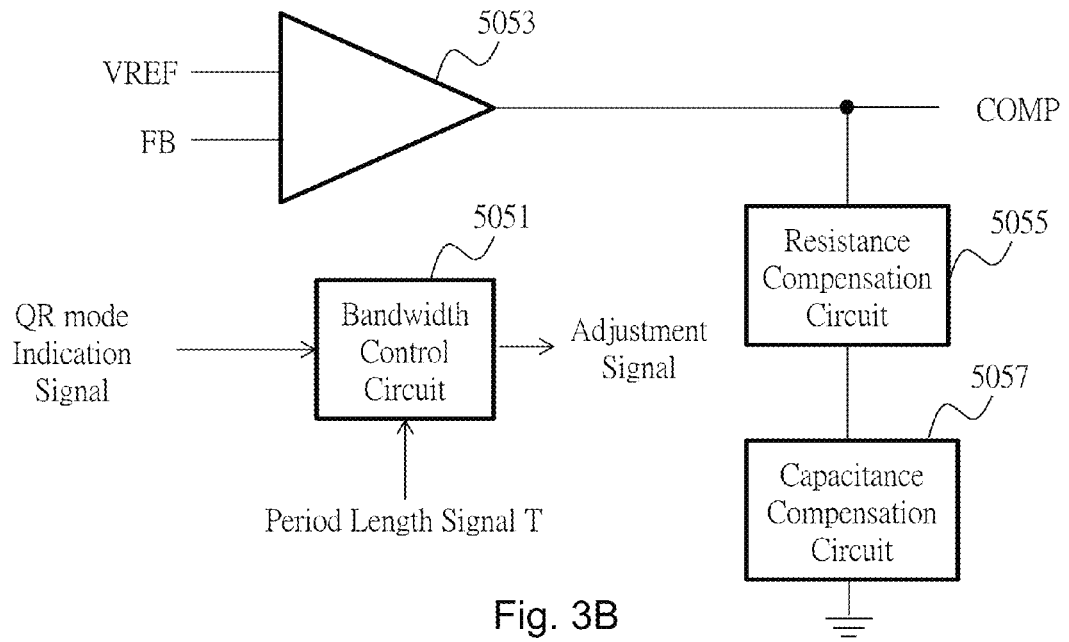

Please refer to FIGS. 3A-3B, which shows a third embodiment according to the present invention. As shown in FIGS. 3A and 3B, in this embodiment, a control circuit 305 adaptively adjusts a bandwidth of an error amplifier circuit 3052 therein according to the PWM frequency of the PWM signal. The control circuit 305 includes, for example but not limited to: a QR control circuit 3051, the error amplifier circuit 3052, a frequency sense circuit 3053, and a PWM signal generation circuit 3059. The QR control circuit 3051 is coupled to the voltage sense circuit 109, for generating a QR mode indication signal when the flyback power converter 100 operates in the QR mode. The frequency sense circuit 3053 generates the period length signal T according to the PWM frequency. As shown in FIG. 3B, the error amplifier circuit 3052 includes: a bandwidth control circuit 5051, an amplification circuit 5053, a resistance compensation circuit 5055, and a capacitance compensation circuit 5057. The bandwidth control circuit 5051 is coupled to the QR control circuit 3051 and the frequency sense circuit 3053, for generating an adjustment signal according to the QR mode indication signal and the period length signal T. The amplification circuit 5053 is coupled to the voltage sense circuit 109, for generating an amplification signal COMP according to a reference voltage VREF and the voltage sense signal FB. The resistance compensation circuit 5055 is coupled to the bandwidth control circuit 5051 and the amplification circuit 5053. The capacitance compensation circuit 5057 is coupled to the bandwidth control circuit 5051 and the amplification circuit 5053. The error amplifier circuit 3052 adaptively adjusts the operation bandwidth of the error amplifier circuit 3052 to compensate the output voltage ripple by adjusting a compensation resistance of the resistance compensation circuit 5055 or a compensation capacitance of the capacitance compensation circuit 5057 according to the adjustment signal. The PWM signal generation circuit 3059 is coupled to the error amplifier circuit 3052 and the current sense circuit 107, for generating the PWM signal according to the amplification signal COMP and the current sense signal CS. The resistance compensation circuit and the capacitance compensation circuit can be embodied in various forms; basically, either the resistance compensation circuit has a controllable variable resistance or the capacitance compensation circuit has a controllable variable capacitance, or both. Variable resistor circuits and variable capacitor circuits are well-known to those skilled in this art.

Figure 4A:
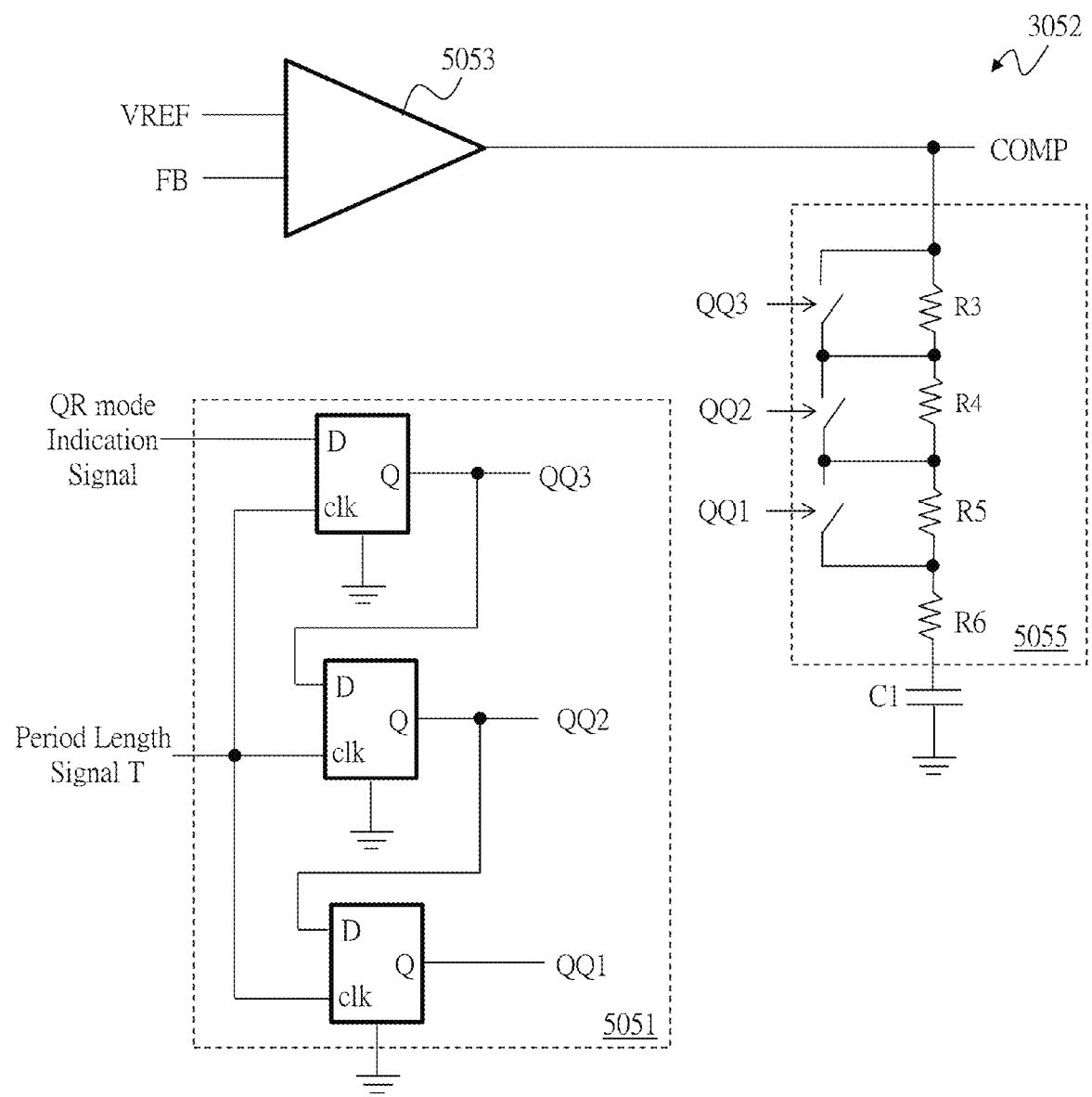
FIGS. 4A-4B show a fourth embodiment of the present invention.
Figure 4B:
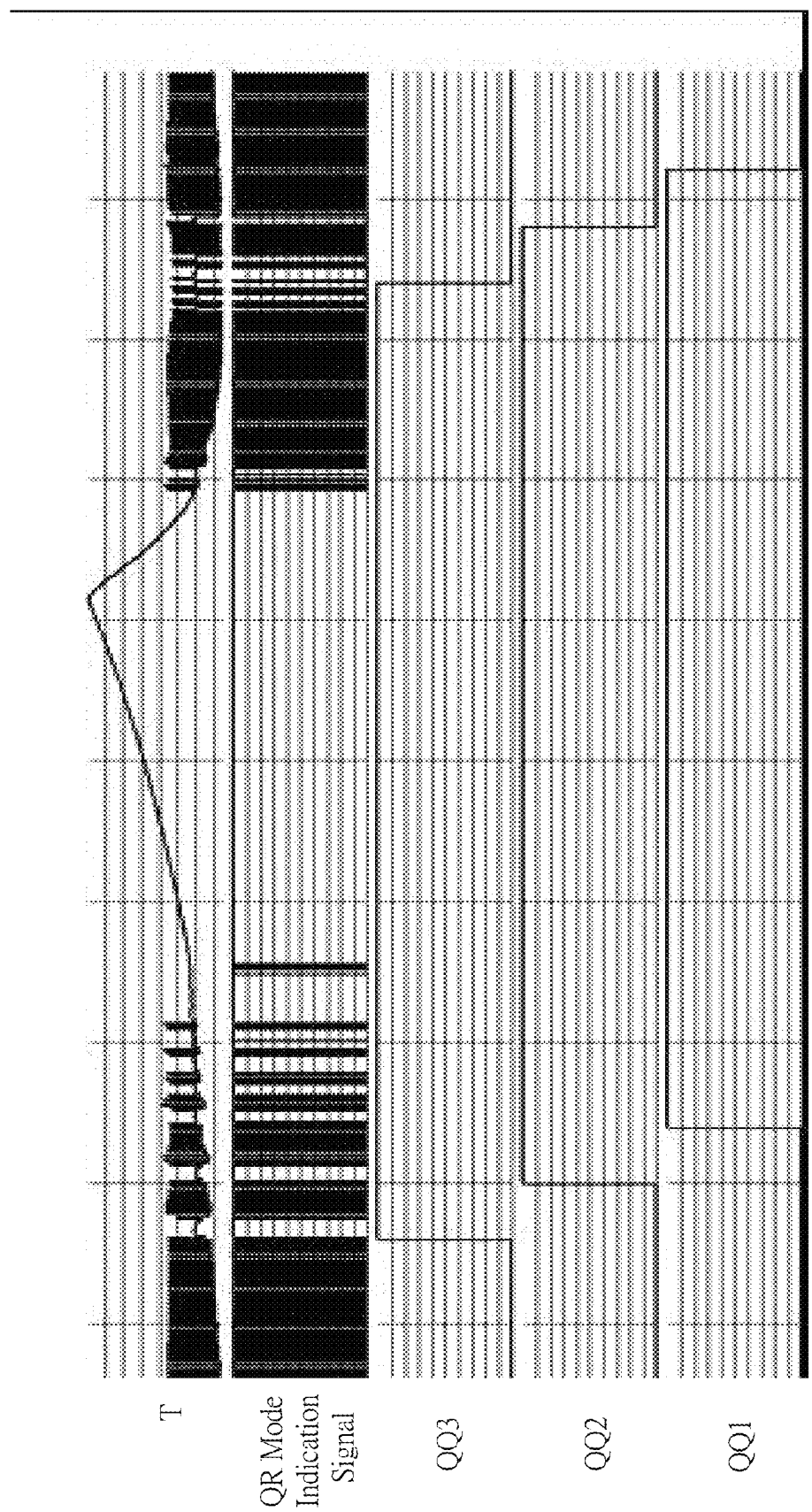

Please refer to FIGS. 4A-4B, which shows a fourth embodiment according to the present invention. FIG. 4A shows a more specific embodiment of the error amplifier circuit 3052. As shown in FIG. 4A, the bandwidth control circuit 5051 includes plural D-type flip-flops, for example but not limited to three D-type flip-flops shown in the figure. The D-type flip-flops shown in the figure generate plural adjustment signals according to the QR mode indication signal and the period length signal T, such as the adjustment signals QQ1, QQ2, and QQ3 as shown in the figure. The resistance compensation circuit 5055 includes a resistor R6, plural resistors connected in series (for example but not limited to resistors R3, R4, and R5 shown in the figure), and corresponding switches. The capacitance compensation circuit 5057 for example includes one capacitor C1. The bandwidth control circuit 5051 generates the adjustment signals QQ1, QQ2, and QQ3 according to the QR mode indication signal and the period length signal T, wherein the adjustment signals QQ1, QQ2, and QQ3 determine the resistance of the resistance compensation circuit 5055, which determines a compensation resistance of the error amplifier circuit 3052. Thus, the operation bandwidth of the error amplifier circuit 3052 is adaptively adjusted according to the PWM frequency, to compensate the output voltage ripple. In another embodiment, the capacitance compensation circuit 5057 may include plural capacitors connected in parallel, and corresponding switches coupled to the plural capacitors, such that the operation bandwidth of the error amplifier circuit 3052 an be adaptively adjusted according to the PWM frequency by adjusting a compensation capacitance of the error amplifier circuit 3052, to compensate the output voltage ripple.

FIG. 4B shows signal waveforms of the adjustment signals QQ1, QQ2, and QQ3, the period length signal T, and the QR mode indication signal. As shown in the figure, in the QR mode, when the period length signal T is higher, indicating a lower PWM frequency, the compensation resistance of the resistance compensation circuit 5055 or the compensation capacitance of the capacitance compensation circuit 5057 is adjusted by the adjustment signals QQ1, QQ2, and QQ3, to adaptively adjust the operation bandwidth of the error amplifier circuit 3052 to compensate the output voltage ripple.

Figure 5:
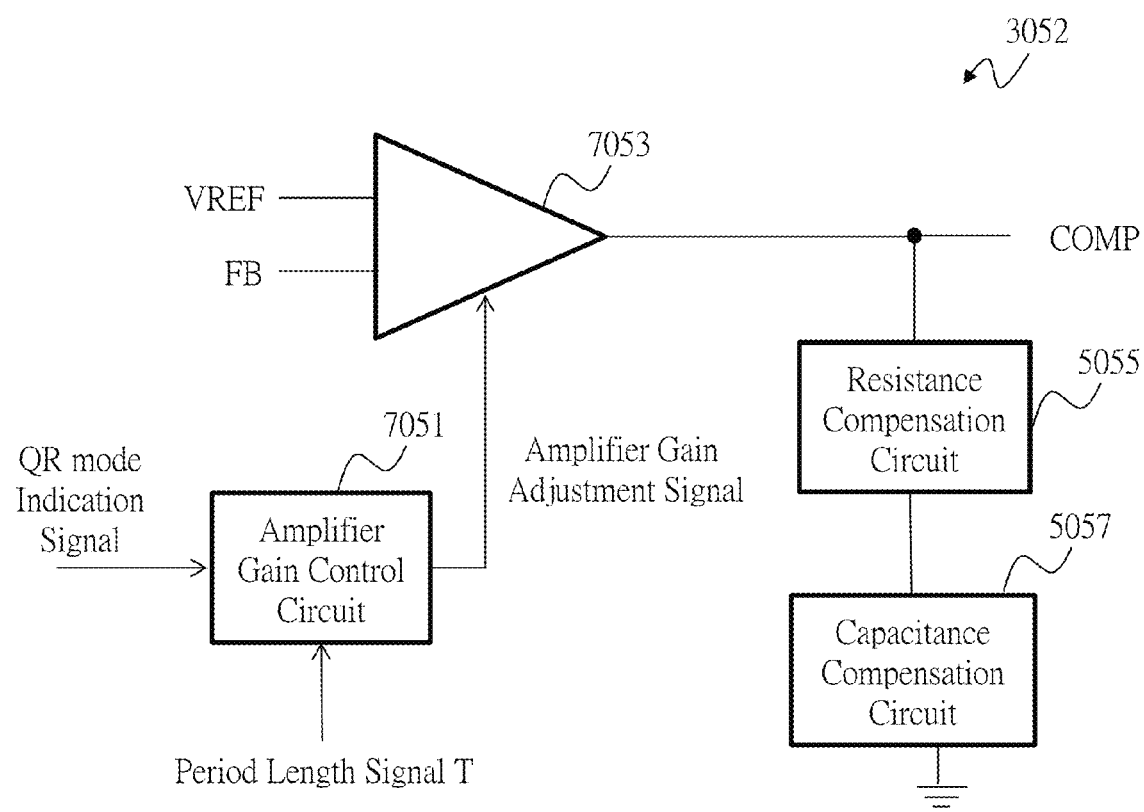
FIG. 5 shows a fifth embodiment of the present invention.

Please refer to FIG. 5 which shows a fifth embodiment according to the present invention. FIG. 5 shows that an amplifier gain instead of the bandwidth of the error amplifier circuit 3052 in the control circuit 305 shown in FIG. 3A can be adaptively adjusted according to the PWM frequency of the PWM signal. As shown in FIG. 5, the error amplifier circuit 3052 includes: an amplifier gain control circuit 7051, an amplification circuit 7053, a resistance compensation circuit 5055, and a capacitance compensation circuit 5057. The amplifier gain control circuit 7051 is coupled to the QR control circuit 3051 and the frequency sense circuit 3053, for generating an amplifier gain adjustment signal according to the QR mode indication signal and the period length signal T. The amplification circuit 7053 is coupled to the voltage sense circuit 109, for generating an amplification signal COMP according to a reference voltage VREF and the voltage sense signal FB. The resistance compensation circuit 5055 is coupled to the amplification circuit 7053. The capacitance compensation circuit 5057 is coupled to the amplification circuit 7053. The error amplifier circuit 3052 adaptively adjusts the amplifier gain of the error amplifier circuit 3052 according to the amplifier gain adjustment signal to compensate the output voltage ripple. The PWM signal generation circuit 3059 is coupled to the error amplifier circuit 3052 and the current sense circuit 107, for generating the PWM signal according to the amplification signal COMP and the current sense signal CS. An amplifier has an amplifier gain, which is well known to those skilled in this art and therefore is not redundantly explained here.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, so the term "couple" should include direct and indirect connections. For another example, the resistors or the voltage divider circuit is not limited to a circuit formed by passive devices, but it may be formed by other circuits, such as transistors. In view of the foregoing, the spirit of the present invention should cover all such and other modifications and variations, which should be interpreted to fall within the scope of the following claims and their equivalents.

What is claimed is:

1. A flyback power converter, comprising:
a power stage circuit, for operating a power switch therein to convert an input voltage to an output voltage according to a pulse width modulation (PWM) signal;
a voltage sense circuit, which is coupled to the power stage circuit, for generating a voltage sense signal according to the output voltage;
a current sense circuit, which is coupled to the power stage circuit, for generating a current sense signal according to a switch current flowing through the power switch; and
a control circuit, which is coupled to the power stage circuit, the voltage sense circuit, and the current sense circuit, for generating the PWM signal according to the voltage sense signal and the current sense signal;
wherein when the flyback power converter operates in a quasi-resonant (QR) mode, the control circuit determines a time point of turning ON the power switch according to a zero voltage crossing event (ZVC) of the output voltage which is indicated by the voltage sense signal that the output voltage changes from a non-zero voltage to zero voltage, and determines a time point of turning OFF the power switch according to the current sense signal, a PWM frequency of the PWM signal, and a predetermined threshold;
wherein the control circuit adaptively adjusts an ON period of the power switch according to the PWM frequency, to compensate an output voltage ripple;
wherein the control circuit adaptively adjusts the ON period of the power switch according to the PWM frequency by one or more of the methods listed below:
(1) adaptively adjusting the predetermined threshold to generate an adjusted threshold according to the PWM frequency, and when the current sense signal reaches the adjusted threshold, controlling the PWM signal to turn OFF the power switch; and
(2) adaptively processing the current sense signal to generate a current indication signal according to the PWM frequency, and when the current indication signal reaches the predetermined threshold, controlling the PWM signal to turn OFF the power switch;
wherein when the control circuit adaptively adjusts the predetermined threshold to generate the adjusted threshold, the control circuit includes:
a first QR control circuit, which is coupled to the voltage sense circuit, for generating a first set signal when a ZVC of the output voltage occurs, and generating a first QR mode indication signal when the flyback power converter operates in the QR mode;
a first frequency sense circuit, for generating a first period length signal according to the PWM frequency;
a first gain control circuit, which is coupled to the first QR control circuit and the first frequency sense circuit, for generating the adjusted threshold according to the first QR mode indication signal, the first period length signal, and the predetermined threshold;
a first comparison circuit, which is coupled to the first gain control circuit and the current sense circuit, for comparing the current sense signal with the adjusted threshold, to generate a first reset signal; and
a first PWM signal generation circuit, which is coupled to the first comparison circuit and the first QR control circuit, for generating the PWM signal according to the first set signal and the first reset signal;
wherein when the control circuit adaptively processes the current sense signal to generate the current indication signal according to the PWM frequency, the control circuit includes:
a second QR control circuit, which is coupled to the voltage sense circuit, for generating a second set signal when the ZVC of the output voltage occurs, and generating a second QR mode indication signal when the flyback power converter operates in the QR mode;
a second frequency sense circuit, for generating a second period length signal according to the PWM frequency;
a second gain control circuit, which is coupled to the second QR control circuit, the second frequency sense circuit, and the current sense circuit, for adaptively processing the current sense signal to generate a current indication signal according to the second QR mode indication signal and the second period length signal;
a second comparison circuit, which is coupled to the second gain control circuit, for comparing the current indication signal with the predetermined threshold, to generate a second reset signal; and
a second PWM signal generation circuit, which is coupled to the second comparison circuit and the second QR control circuit, for generating the PWM signal according to the second set signal and the second reset signal.

2. The flyback power converter of claim 1, wherein when the control circuit adaptively adjusts the predetermined threshold to generate the adjusted threshold according to the PWM frequency, the gain control circuit includes:
a frequency weighting circuit, which is coupled to the QR control circuit and the frequency sense circuit, for generating a frequency weighting signal related to the PWM frequency according to the QR mode indication signal, the PWM signal, and the period length signal; and a calculation circuit, which is coupled to the frequency weighting circuit, for generating the adjusted threshold according to the predetermined threshold and the frequency weighting signal.

3. The flyback power converter of claim 1, wherein when the control circuit adaptively processes the current sense signal to generate the current indication signal according to the PWM frequency, the gain control circuit includes:

a frequency weighting circuit, which is coupled to the QR control circuit and the frequency sense circuit, for generating a frequency weighting signal related to the PWM frequency according to the QR mode indication signal, the PWM signal, and the period length signal; and a calculation circuit, which is coupled to the frequency weighting circuit, for generating the current indication signal according to the current sense signal and the frequency weighting signal.

4. A flyback power converter, comprising:

a power stage circuit, for operating a power switch therein to convert an input voltage to an output voltage according to a pulse width modulation (PWM) signal;

a voltage sense circuit, which is coupled to the power stage circuit, for generating a voltage sense signal according to the output voltage;

a current sense circuit, which is coupled to the power stage circuit, for generating a current sense signal according to a switch current flowing through the power switch; and a control circuit, which is coupled to the power stage circuit, the voltage sense circuit, and the current sense circuit, for generating the PWM signal according to the voltage sense signal and the current sense signal;

wherein when the flyback power converter operates in a quasi-resonant (QR) mode, the control circuit determines a time point of turning ON the power switch according to a zero voltage crossing event (ZVC) of the output voltage which is indicated by the voltage sense signal that the output voltage changes from a non-zero voltage to zero voltage, and determines a time point of turning OFF the power switch according to the current sense signal, a PWM frequency of the PWM signal, and a predetermined threshold;

wherein the control circuit adaptively adjusts an operation bandwidth of an error amplifier circuit according to the PWM frequency, and the control circuit includes:

a QR control circuit, which is coupled to the voltage sense circuit, for generating a QR mode indication signal when the flyback power converter operates in the QR mode;

a frequency sense circuit, for generating a period length signal according to the PWM frequency;

the error amplifier circuit, including:

a bandwidth control circuit, which is coupled to the QR control circuit and the frequency sense circuit, for generating an adjustment signal according to the QR mode indication signal and the period length signal;

an amplification circuit, which is coupled to the voltage sense circuit, for generating an amplification signal according to a reference voltage and the voltage sense signal;

a resistance compensation circuit, which is coupled to the bandwidth control circuit and the amplification circuit; and a capacitance compensation circuit, which is coupled to the bandwidth control circuit and the amplification circuit; and a PWM signal generation circuit, which is coupled to the error amplifier circuit and the current sense circuit, for generating the PWM signal according to the amplification signal and the current sense signal;

wherein the error amplifier circuit adaptively adjusts the operation bandwidth of the error amplifier circuit to compensate the output voltage ripple by adjusting a compensation resistance of the resistance compensation circuit or a compensation capacitance of the capacitance compensation circuit or both according to the adjustment signal.

5. A flyback power converter, comprising:

a power stage circuit, for operating a power switch therein to convert an input voltage to an output voltage according to a pulse width modulation (PWM) signal;

a voltage sense circuit, which is coupled to the power stage circuit, for generating a voltage sense signal according to the output voltage;

a current sense circuit, which is coupled to the power stage circuit, for generating a current sense signal according to a switch current flowing through the power switch; and a control circuit, which is coupled to the power stage circuit, the voltage sense circuit, and the current sense circuit, for generating the PWM signal according to the voltage sense signal and the current sense signal;

wherein when the flyback power converter operates in a quasi-resonant (QR) mode, the control circuit determines a time point of turning ON the power switch according to a zero voltage crossing event (ZVC) of the output voltage which is indicated by the voltage sense signal that the output voltage changes from a non-zero voltage to zero voltage, and determines a time point of turning OFF the power switch according to the current sense signal, a PWM frequency of the PWM signal, and a predetermined threshold;

wherein the control circuit adaptively adjusts the amplifier gain of the error amplifier circuit according to the PWM frequency, and the control circuit includes:

a QR control circuit, which is coupled to the voltage sense circuit, for generating a QR mode indication signal when the flyback power converter operates in the QR mode;

a frequency sense circuit, for generating a period length signal according to the PWM frequency;

the error amplifier circuit, including:

an amplifier gain control circuit, which is coupled to the QR control circuit and the frequency sense circuit, for generating an amplifier gain adjustment signal according to the QR mode indication signal and the period length signal, wherein the amplifier gain adjustment signal is for adjusting an amplifier gain of the error amplifier circuit;

an amplification circuit, which is coupled to the voltage sense circuit, for generating an amplification signal according to a reference voltage, the voltage sense signal, and the amplifier gain;

a resistance compensation circuit, which is coupled to the amplification circuit; and a capacitance compensation circuit, which is coupled to the amplification circuit; and a PWM signal generation circuit, which is coupled to the error amplifier circuit and the current sense circuit, for generating the PWM signal according to the amplification signal and the current sense signal.

6. A control circuit of a flyback power converter, wherein the flyback power converter includes a power stage circuit, a voltage sense circuit, a current sense circuit, and the control circuit, wherein the power stage circuit operates a power switch therein to convert an input voltage to an output voltage according to a pulse width modulation (PWM) signal, and the voltage sense circuit is coupled to the power stage circuit, for generating a voltage sense signal according to the output voltage, and the current sense circuit is coupled to the power stage circuit, for generating a current sense signal according to a switch current flowing through the power switch, and the control circuit is coupled to the power stage circuit, the voltage sense circuit, and the current sense circuit, for generating the PWM signal according to the voltage sense signal and the current sense signal, wherein when the flyback power converter operates in a quasi-resonant (QR) mode, the control circuit determines a time point of turning ON the power switch according to a zero voltage crossing event (ZVC) of the output voltage which is indicated by the voltage sense signal that the output voltage changes from a non-zero voltage to zero voltage, and determines a time point of turning OFF the power switch according to the current sense signal, a PWM frequency of the PWM signal, and a predetermined threshold, wherein the control circuit adaptively adjusts an ON period of the power switch according to the PWM frequency to compensate an output voltage ripple, the control circuit comprising:
- a QR control circuit, which is coupled to the voltage sense circuit, for generating a set signal when a ZVC of the output voltage occurs, and generating a QR mode indication signal when the flyback power converter operates in the QR mode;
- a frequency sense circuit, for generating a period length signal according to the PWM frequency;
- a gain control circuit, which is coupled to the QR control circuit and the frequency sense circuit, for generating an adjusted threshold by adaptively adjusting the predetermined threshold according to the QR mode indication signal and the period length signal;
- a comparison circuit, which is coupled to the gain control circuit and the current sense circuit, for comparing the current sense signal with the adjusted threshold, to generate a reset signal; and
- a PWM signal generation circuit, which is coupled to the comparison circuit and the QR control circuit, for generating the PWM signal according to the set signal and the reset signal, such that when the voltage sense signal indicates that a ZVC of the output voltage occurs, the power switch is turned ON, and when the current sense signal reaches the adjusted threshold, the power switch is turned OFF.

7. The control circuit of claim 6, wherein the gain control circuit includes:
- a frequency weighting circuit, which is coupled to the QR control circuit and the frequency sense circuit, for generating a frequency weighting signal related to the PWM frequency according to the QR mode indication signal, the PWM signal, and the period length signal; and
- a calculation circuit, which is coupled to the frequency weighting circuit, for generating the adjusted threshold according to the predetermined threshold and the frequency weighting signal.

8. The control circuit of claim 6, wherein the control circuit adaptively adjusts the ON period according to the PWM frequency, to change a peak of the current sense signal, such that an input power of the flyback power converter maintains constant, and $$P = \frac{1}{2} fs \times Lm \times \left(\frac{Vcs}{Rcs}\right)^2$$

wherein P is the input power, fs is the PWM frequency, Lm is a primary side inductance of a transformer in the power stage circuit, Vcs is the peak of the current sense signal, and Rcs is a resistance of the current sense circuit.

9. A control circuit of a flyback power converter, wherein the flyback power converter includes a power stage circuit, a voltage sense circuit, a current sense circuit, and the control circuit, wherein the power stage circuit operates a power switch therein to convert an input voltage to an output voltage according to a pulse width modulation (PWM) signal, and the voltage sense circuit is coupled to the power stage circuit, for generating a voltage sense signal according to the output voltage, and the current sense circuit is coupled to the power stage circuit, for generating a current sense signal according to a switch current flowing through the power switch, and the control circuit is coupled to the power stage circuit, the voltage sense circuit, and the current sense circuit, for generating the PWM signal according to the voltage sense signal and the current sense signal, wherein when the flyback power converter operates in a quasi-resonant (QR) mode, the control circuit determines a time point of turning ON the power switch according to a zero voltage crossing event (ZVC) of the output voltage indicated by the voltage sense signal, and determines a time point of turning OFF the power switch according to the current sense signal, a PWM frequency of the PWM signal, and a predetermined threshold, wherein the control circuit adaptively adjusts an ON period of the power switch according to the PWM frequency to compensate an output voltage ripple, the control circuit comprising:
- a QR control circuit, which is coupled to the voltage sense circuit, for generating a set signal when a ZVC of the output voltage occurs, and generating a QR mode indication signal when the flyback power converter operates in the QR mode;
- a frequency sense circuit, for generating a period length signal according to the PWM frequency;
- a gain control circuit, which is coupled to the QR control circuit, the frequency sense circuit, and the current sense circuit, for adaptively processing the current sense signal to generate a current indication signal according to the QR mode indication signal and the period length signal;
- a comparison circuit, which is coupled to the gain control circuit, for comparing the current indication signal with the predetermined threshold, to generate a reset signal; and
- a PWM signal generation circuit, which is coupled to the comparison circuit and the QR control circuit, for generating the PWM signal according to the set signal and the reset signal, such that when the voltage sense signal indicates that a ZVC of the output voltage occurs, the power switch is turned ON, and when the current indication signal reaches the adjusted threshold, the power switch is turned OFF.

10. The control circuit of claim 9, wherein the gain control circuit includes:

a frequency weighting circuit, which is coupled to the QR control circuit and the frequency sense circuit, for generating a frequency weighting signal related to the PWM frequency according to the QR mode indication signal, the PWM signal, and the period length signal; and a calculation circuit, which is coupled to the frequency weighting circuit, for generating the current indication signal according to the current sense signal and the frequency weighting signal.

11. The control circuit of claim 9, wherein the control circuit adaptively adjusts the ON period according to the PWM frequency to change a peak of the current sense signal, such that an input power of the flyback power converter maintains constant, and $$P = \frac{1}{2} fs \times Lm \times \left(\frac{Vcs}{Rcs}\right)^2$$

wherein P is the input power, fs is the PWM frequency, Lm is a primary side inductance of a transformer in the power stage circuit, Vcs is the peak of the current sense signal, and Rcs is a resistance of the current sense circuit.

12. A control circuit of a flyback power converter, wherein the flyback power converter includes a power stage circuit, a voltage sense circuit, a current sense circuit, and the control circuit, wherein the power stage circuit operates a power switch therein to convert an input voltage to an output voltage according to a pulse width modulation (PWM) signal, and the voltage sense circuit is coupled to the power stage circuit, for generating a voltage sense signal according to the output voltage, and the current sense circuit is coupled to the power stage circuit, for generating a current sense signal according to a switch current flowing through the power switch, and the control circuit is coupled to the power stage circuit, the voltage sense circuit, and the current sense circuit, for generating the PWM signal according to the voltage sense signal and the current sense signal, wherein when the flyback power converter operates in a quasi-resonant (QR) mode, the control circuit determines a time point of turning ON the power switch according to a zero voltage crossing event (ZVC) of the output voltage which is indicated by the voltage sense signal that the output voltage changes from a non-zero voltage to zero voltage, and determines a time point of turning OFF the power switch according to the current sense signal, a PWM frequency of the PWM signal, and a predetermined threshold, the control circuit comprising:

a QR control circuit, which is coupled to the voltage sense circuit, for generating a QR mode indication signal when the flyback power converter operates in the QR mode;

a frequency sense circuit, for generating a period length signal according to the PWM frequency;

an error amplifier circuit, including:

a bandwidth control circuit, which is coupled to the QR control circuit and the frequency sense circuit, for generating an adjustment signal according to the QR mode indication signal and the period length signal;

an amplification circuit, which is coupled to the voltage sense circuit, for generating an amplification signal according to a reference voltage and the voltage sense signal;

a resistance compensation circuit, which is coupled to the bandwidth control circuit and the amplification circuit; and a capacitance compensation circuit, which is coupled to the bandwidth control circuit and the amplification circuit; and a PWM signal generation circuit, which is coupled to the error amplifier circuit and the current sense circuit, for generating the PWM signal according to the amplification signal and the current sense signal;

wherein the error amplifier circuit adaptively adjusts the operation bandwidth of the error amplifier circuit to compensate the output voltage ripple by adjusting a compensation resistance of the resistance compensation circuit or a compensation capacitance of the capacitance compensation circuit or both according to the adjustment signal.

13. The control circuit of claim 12, wherein the control circuit adaptively adjusts the operation bandwidth according to the PWM frequency to change a peak of the current sense signal, such that an input power of the flyback power converter maintains constant, and $$P = \frac{1}{2} fs \times Lm \times \left(\frac{Vcs}{Rcs}\right)^2$$

wherein P is the input power, fs is the PWM frequency, Lm is a primary side inductance of a transformer in the power stage circuit, Vcs is the peak of the current sense signal, and Rcs is a resistance of the current sense circuit.

14. A control circuit of a flyback power converter, wherein the flyback power converter includes a power stage circuit, a voltage sense circuit, a current sense circuit, and the control circuit, wherein the power stage circuit operates a power switch therein to convert an input voltage to an output voltage according to a pulse width modulation (PWM) signal, and the voltage sense circuit is coupled to the power stage circuit, for generating a voltage sense signal according to the output voltage, and the current sense circuit is coupled to the power stage circuit, for generating a current sense signal according to a switch current flowing through the power switch, and the control circuit is coupled to the power stage circuit, the voltage sense circuit, and the current sense circuit, for generating the PWM signal according to the voltage sense signal and the current sense signal, wherein when the flyback power converter operates in a quasi-resonant (QR) mode, the control circuit determines a time point of turning ON the power switch according to a zero voltage crossing event (ZVC) of the output voltage which is indicated by the voltage sense signal that the output voltage changes from a non-zero voltage to zero voltage, and determines a time point of turning OFF the power switch according to the current sense signal, a PWM frequency of the PWM signal, and a predetermined threshold, wherein the control circuit adaptively an amplifier gain of an error amplifier therein according to the PWM frequency, the control circuit comprising:

a QR control circuit, which is coupled to the voltage sense circuit, for generating a QR mode indication signal when the flyback power converter operates in the QR mode;

a frequency sense circuit, for generating a period length signal according to the PWM frequency;

the error amplifier circuit, including:

an amplifier gain control circuit, which is coupled to the QR control circuit and the frequency sense circuit, for generating an amplifier gain adjustment signal according to the QR mode indication signal and the period length signal;

an amplification circuit, which is coupled to the voltage sense circuit, for adjusting the amplifier gain according to the amplifier gain adjustment signal, and generating an amplification signal according to a reference voltage, the voltage sense signal, and the amplifier gain;

a resistance compensation circuit, which is coupled to the amplification circuit; and a capacitance compensation circuit, which is coupled to the amplification circuit; and a PWM signal generation circuit, which is coupled to the error amplifier circuit and the current sense circuit, for generating the PWM signal according to the amplification signal and the current sense signal.

15. The control circuit of claim 14, wherein the control circuit adaptively adjusts the amplifier gain according to the PWM frequency to change a peak of the current sense signal, such that an input power of the flyback power converter maintains constant, and $$P = \frac{1}{2} fs \times Lm \times \left(\frac{Vcs}{Rcs}\right)^2$$

wherein P is the input power, fs is the PWM frequency, Lm is a primary side inductance of a transformer in the power stage circuit, Vcs is the peak of the current sense signal, and Rcs is a resistance of the current sense circuit.

16. A control method of a flyback power converter, comprising:

operating a power switch of a power stage circuit to convert an input voltage to an output voltage according to a pulse width modulation (PWM) signal;

generating a voltage sense signal according to the output voltage;

generating a current sense signal according to a switch current flowing through the power switch;

generating the PWM signal according to the voltage sense signal and the current sense signal, whereby a feedback control loop is formed;

when the flyback power converter operates in a quasi-resonant (QR) mode, determining a time point of turning ON the power switch according to a zero voltage crossing event (ZVC) of the output voltage which is indicated by the voltage sense signal that the output voltage changes from a non-zero voltage to zero voltage, and determining a time point of turning OFF the power switch according to the current sense signal, a PWM frequency of the PWM signal, and a predetermined threshold; and adaptively adjusting an ON period of the power switch according to the PWM frequency, to compensate an output voltage ripple;

wherein the step of adaptively adjusting the ON period of the power switch according to the PWM frequency to compensate the output voltage ripple, includes:

generating a set signal when the ZVC of the output voltage occurs, and generating a QR mode indication signal when the flyback power converter operates in the QR mode;

generating a period length signal according to the PWM frequency;

generating the adjusted threshold according to the QR mode indication signal, the period length signal, and the predetermined threshold; or adaptively processing the current sense signal to generate a current indication signal according to the QR mode indication signal and the period length signal;

comparing the current sense signal with the adjusted threshold to generate a reset signal; or comparing the current indication signal with the predetermined threshold, to generate a reset signal; and generating the PWM signal according to the set signal and the reset signal.

17. The control method of claim 16, wherein the step of generating the adjusted threshold according to the QR mode indication signal, the period length signal, and the predetermined threshold, includes:

generating a frequency weighting signal related to the PWM frequency according to the QR mode indication signal, the PWM signal, and the period length signal; and generating the adjusted threshold according to the predetermined threshold and the frequency weighting signal.

18. A control method of a flyback power converter, comprising:

operating a power switch of a power stage circuit to convert an input voltage to an output voltage according to a pulse width modulation (PWM) signal;

generating a voltage sense signal according to the output voltage;

generating a current sense signal according to a switch current flowing through the power switch;

generating the PWM signal according to the voltage sense signal and the current sense signal, whereby a feedback control loop is formed;

when the flyback power converter operates in a quasi-resonant (QR) mode, determining a time point of turning ON the power switch according to a zero voltage crossing event (ZVC) of the output voltage which is indicated by the voltage sense signal that the output voltage changes from a non-zero voltage to zero voltage, and determining a time point of turning OFF the power switch according to the current sense signal, a PWM frequency of the PWM signal, and a predetermined threshold; and adaptively adjusting an ON period of the power switch according to the PWM frequency, to compensate an output voltage ripple;

wherein the step of adaptively adjusting the ON period of the power switch according to the PWM frequency, includes one or more of the methods listed below:

(1) adaptively adjusting the predetermined threshold to generate an adjusted threshold according to the PWM frequency, and when the current sense signal reaches the adjusted threshold, controlling the PWM signal to turn OFF the power switch; and (2) adaptively processing the current sense signal to generate a current indication signal according to the PWM frequency, and when the current indication signal reaches the predetermined threshold, controlling the PWM signal to turn OFF the power switch;

wherein the step of adaptively processing the current sense signal to generate a current indication signal according to the PWM frequency includes:

generating a frequency weighting signal related to the PWM frequency according to the QR mode indication signal, the PWM signal, and the period length signal; and generating the current indication signal according to the current sense signal and the frequency weighting signal.

19. A control method of a flyback power converter, comprising:

operating a power switch of a power stage circuit to convert an input voltage to an output voltage according to a pulse width modulation (PWM) signal;

generating a voltage sense signal according to the output voltage;

generating a current sense signal according to a switch current flowing through the power switch;

generating the PWM signal according to the voltage sense signal and the current sense signal, whereby a feedback control loop is formed;

when the flyback power converter operates in a quasi-resonant (QR) mode, determining a time point of turning ON the power switch according to a zero voltage crossing event (ZVC) of the output voltage which is indicated by the voltage sense signal that the output voltage changes from a non-zero voltage to zero voltage, and determining a time point of turning OFF the power switch according to the current sense signal, a PWM frequency of the PWM signal, and a predetermined threshold; and adaptively adjusting an operation bandwidth of an error amplifier circuit in the feedback control loop according to the PWM frequency, to compensate an output voltage ripple;

wherein the step of adaptively adjusting the operation bandwidth of an error amplifier circuit in the feedback loop according to the PWM frequency to compensate the output voltage ripple, includes:

generating a QR mode indication signal when the flyback power converter operates in the QR mode;

generating a period length signal according to the PWM frequency;

generating an adjustment signal according to the QR mode indication signal and the period length signal;

generating an amplification signal according to a reference voltage and the voltage sense signal; and generating the PWM signal according to the amplification signal and the current sense signal;

wherein the error amplifier circuit adaptively adjusts the operation bandwidth of the error amplifier circuit to compensate the output voltage ripple by adjusting a compensation resistance or a compensation capacitance or both according to the adjustment signal.

20. A control method of a flyback power converter, comprising:

operating a power switch of a power stage circuit to convert an input voltage to an output voltage according to a pulse width modulation (PWM) signal;

generating a voltage sense signal according to the output voltage;

generating a current sense signal according to a switch current flowing through the power switch;

generating the PWM signal according to the voltage sense signal and the current sense signal, whereby a feedback control loop is formed;

when the flyback power converter operates in a quasi-resonant (QR) mode, determining a time point of turning ON the power switch according to a zero voltage crossing event (ZVC) of the output voltage which is indicated by the voltage sense signal that the output voltage changes from a non-zero voltage to zero voltage, and determining a time point of turning OFF the power switch according to the current sense signal, a PWM frequency of the PWM signal, and a predetermined threshold; and adaptively adjusting an amplifier gain of an error amplifier circuit in the feedback control loop according to the PWM frequency, to compensate an output voltage ripple;

wherein the step of adaptively adjusting the amplifier gain of the error amplifier circuit in the feedback control loop according to the PWM frequency to compensate the output voltage ripple, includes:

generating a QR mode indication signal when the flyback power converter operates in the QR mode;

generating a period length signal according to the PWM frequency;

generating an amplifier gain adjustment signal according to the QR mode indication signal and the period length signal;

adjusting an amplifier gain of the error amplifier circuit according to the amplifier gain adjustment signal;

generating an amplification signal according to a reference voltage, the voltage sense signal, and the amplifier gain; and generating the PWM signal according to the amplification signal and the current sense signal.

* * * * *